(12) United States Patent
Hinshaw et al.

(10) Patent No.: US 7,577,667 B2
(45) Date of Patent: *Aug. 18, 2009

(54) PROGRAMMABLE STREAMING DATA PROCESSOR FOR DATABASE APPLIANCE HAVING MULTIPLE PROCESSING UNIT GROUPS

(75) Inventors: Foster D. Hinshaw, Somerville, MA (US); David L. Meyers, Shrewsbury, MA (US); Barry M. Zane, Wayland, MA (US)

(73) Assignee: Netezza Corporation, Marlborough, MA (US)

( * ) Notice: Subject to any disclaimer, the term of this patent is extended or adjusted under 35 U.S.C. 154(b) by 1071 days.

This patent is subject to a terminal disclaimer.

(21) Appl. No.: 10/668,113

(22) Filed: Sep. 18, 2003

(65) Prior Publication Data

US 2004/0148420 A1    Jul. 29, 2004

Related U.S. Application Data

(60) Provisional application No. 60/412,057, filed on Sep. 19, 2002, provisional application No. 60/411,686, filed on Sep. 18, 2002.

(51) Int. Cl.
  *G06F 7/00* (2006.01)
  *G06F 17/00* (2006.01)
(52) U.S. Cl. .................. 707/100; 707/10; 707/103 X; 709/201
(58) Field of Classification Search ............. 707/1–10, 707/100–104.1, 200–206; 790/201, 217, 790/219
See application file for complete search history.

(56) References Cited

U.S. PATENT DOCUMENTS

| | | | |
|---|---|---|---|
| 4,068,301 | A | 1/1978 | Ishino et al. |
| 4,594,655 | A | 6/1986 | Hao et al. |
| 4,811,214 | A | 3/1989 | Nosenchuck et al. |
| 5,687,363 | A | 11/1997 | Oulid-Aissa et al. |
| 5,701,460 | A | 12/1997 | Kaplan et al. |
| 5,721,909 | A | 2/1998 | Oulid-Aissa et al. |

FOREIGN PATENT DOCUMENTS

WO    WO 98/55946    12/1998

OTHER PUBLICATIONS

Boquan Xie et al., Hierarchical architecture for parallel query processing on networks of workstations, Dec. 17-20, 1998, IEEE, 351-358.*

(Continued)

*Primary Examiner*—Jean B Fleurantin
(74) *Attorney, Agent, or Firm*—Hamilton, Brook, Smith & Reynolds, P.C.

(57) ABSTRACT

A data processing system having two or more groups of data processors that have attributes that are optimized for their assigned functions. A first group consists of one or more host computers responsible for interfacing with applications and/or end users to obtain queries and for planning query execution. A second processor group consists of many streaming record-oriented processors called Job Processing Units (JPUs), preferably arranged as an MPP structure. The JPUs typically carry out the bulk of the data processing required to implement the logic of a query. Each of the JPUs typically include a general purpose microcomputer, local memory, one or more mass storage devices, and one or more network connections. Each JPU also has a special purpose programmable processor, referred to herein as a Programmable Streaming Data Processor (PSDP). The PSDP serves as an interface between the CPU of a JPU and the mass storage device, to offload functions from the CPU of the JPU.

31 Claims, 7 Drawing Sheets

U.S. PATENT DOCUMENTS

| | | | |
|---|---|---|---|
| 5,781,897 | A | 7/1998 | Chen et al. |
| 5,822,527 | A | 10/1998 | Post |
| 5,835,755 | A | 11/1998 | Stellwagen, Jr. |
| 5,860,087 | A | 1/1999 | Maeda et al. |
| 5,884,299 | A | 3/1999 | Ramesh et al. |
| 5,937,401 | A | 8/1999 | Hillegas |
| 5,937,415 | A | 8/1999 | Sheffield et al. |
| 5,983,270 | A | 11/1999 | Abraham et al. |
| 5,999,937 | A | 12/1999 | Ellard |
| 6,078,955 | A | 6/2000 | Konno et al. |
| 6,138,118 | A | 10/2000 | Koppelstein et al. |
| 6,151,602 | A | 11/2000 | Hejlsberg et al. |
| 6,295,533 | B2 | 9/2001 | Cohen |
| 6,332,163 | B1 | 12/2001 | Bowman-Amuah |
| 6,339,772 | B1 | 1/2002 | Klein et al. |
| 6,345,206 | B1 | 2/2002 | Adamy et al. |
| 6,415,373 | B1 | 7/2002 | Peters et al. |
| 6,434,649 | B1 | 8/2002 | Baker et al. |
| 6,477,540 | B1 * | 11/2002 | Singh et al. ............. 707/103 R |
| 6,493,701 | B2 | 12/2002 | Ponnekanti |
| 6,493,761 | B1 | 12/2002 | Baker et al. |
| 6,507,834 | B1 | 1/2003 | Kabra et al. |
| 6,529,896 | B1 | 3/2003 | Leung et al. |
| 6,542,508 | B1 | 4/2003 | Lin |
| 6,542,886 | B1 | 4/2003 | Chaudhuri et al. |
| 6,594,651 | B2 | 7/2003 | Kabra et al. |
| 6,601,064 | B1 | 7/2003 | Nag et al. |
| 6,721,749 | B1 | 4/2004 | Najm et al. |
| 6,732,084 | B1 | 5/2004 | Kabra et al. |
| 6,789,116 | B1 | 9/2004 | Sarkissian et al. |
| 6,996,117 | B2 | 2/2006 | Lee et al. |
| 2001/0036322 | A1 | 11/2001 | Bloomfield et al. |
| 2002/0038313 | A1 | 3/2002 | Klein et al. |
| 2002/0052749 | A1 | 5/2002 | Bauer |
| 2002/0095400 | A1 | 7/2002 | Johnson et al. |
| 2002/0116358 | A1 | 8/2002 | Heath |
| 2002/0128823 | A1 | 9/2002 | Kovacevic |
| 2002/0161748 | A1 | 10/2002 | Hamel et al. |
| 2003/0009531 | A1 | 1/2003 | Richmann et al. |
| 2003/0126056 | A1 | 7/2003 | Hausman et al. |
| 2003/0212668 | A1 | 11/2003 | Hinshaw et al. |
| 2004/0117037 | A1 | 6/2004 | Hinshaw et al. |
| 2004/0133565 | A1 | 7/2004 | Hinshaw et al. |
| 2005/0021813 | A1 | 1/2005 | Kovacevic et al. |
| 2005/0154705 | A1 | 7/2005 | Zwiegincew et al. |

OTHER PUBLICATIONS

Nikolopoulos, et al., Adaptive scheduling under memory pressure on multiprogrammed SMPs, IEEE, Apr. 15-19, 2002, 11-16.*

Acharya, A., et al., "Tuning the Performance of I/O-Intensive Parallel Applications," *ACM*, pp. 15-27, May 1996.

Moon, S. and Hall, M. W., "Evaluation of Predicated Array Data-Flow for Automatic Parallelization," *ACM*, pp. 84-95, Aug. 1999.

Acharya, A., et al., "Active Disks: Programming Model, Algorithms and Evaluation," ACM *Sigplan Notices, Association for Computing Machinery*, (33)11:81-91 (Nov. 1998).

Keeton, K., et al., "A Case for Intelligent Disks (IDISKs)," *SIGMOD Record*, (27)3:41-52, (Sep. 1998).

Graefe, G., "Query Evaluation Techniques for Large Databases," *ACM Computing Surveys*, (25)2:73-170, (Jun. 1993).

Dewitt, D., et al., "Parallel Database Systems: The Future of High Performance Database Systems," *Communications of the Association for Computing Machinery* (3):6:85-98, (Jun. 1992).

Uysal, M., et al., "Evaluation of Active Disks for Decision Support Databases," *IEEE*, pp. 337-348, (1999).

Guyetant, S., et al., "Architecture Parallèle Reconfigurable Pour La Génoique," Renpar'14, ASF, Sympa Conference, pp. 1-4, (Apr. 2002).

Riedel, E., et al., "Active Disks for Large-Scale Data Processing," *Computer, IEEE*, (34)6:68-74, (2001).

Hsu, W. W., et al., "Projecting the Performance of Decision Support Workloads on Systems with Smart Storage (SmartSTOR)," *IEEE*, pp. 417-425, (2000).

Dimakopoulos, V. V., et al., "The SMart Autonomous Storage (SMAS) System," *IEEE*, vol. 1, pp. 303-306, (2001).

Memik, G., et al., "Design and Evaluation of a Smart Disk Cluster for DSS Commercial Workloads," *J. of Parallel and Distributed Computing*, (61)1633-1664, (2001).

Wickremesinghe, R., et al., "Distributed Computing with Load-Managed Active Storage," Proceedings of the 11th IEEE International Symposium on High Performance Distributed Computing HPDC-11 2002) (HPDC'02), pp. 13-23, (Jul. 2002).

Leilich, H., et al., "A Search Processor for Data Base Management Systems," Proceedings of the Fourth International Conference on Very Large Data Bases, IEEE, pp. 280-287, (Sep. 1978).

* cited by examiner

PROGRAMMABLE STREAMING DATA PROCESSOR FOR DATABASE APPLIANCE HAVING MULTIPLE PROCESSING UNIT GROUPS

RELATED APPLICATIONS

This application claims the benefit of U.S. Provisional Application No. 60/412,057 entitled "Asymmetric Streaming Record Processing Computer System," filed on Sep. 19, 2002, and U.S. Provisional Application No. 60/411,686 entitled "Intelligent Storage Device Controller," filed on Sep. 18, 2002. The entire teachings of these provisional applications is hereby incorporated by reference.

This application is also related to U.S. Patent Application entitled "Intelligent Storage Device Controller," (application Ser. No. 10/667,203); U.S. Patent Application entitled "Field Oriented Pipeline Architecture for a Programmable Data Streaming Processor," (application Ser. No. 10/665,726); U.S. Patent Application entitled "Asymmetric Streaming Record Data Processor Method and Apparatus," (application Ser. No. 10/666,729); and U.S. Patent Application entitled "Asymmetric Data Streaming Architecture Having Autonomous and Asynchronous Job Processing Unit," (application Ser. No. 10/667,128), all of which are being filed together on the same date as this application. The entire teachings of each of these patent applications is also hereby incorporated by reference. This application and the above applications are also all assigned to Netezza Corporation.

BACKGROUND OF THE INVENTION

This invention relates to distributed data processing systems that use multiple processing unit groups, and in particular to programmable data streaming processor that performs initial processing before tuples are handled by a job processor.

With continued development of low cost computing systems and proliferation of computer networks, the world continues to see an exponential growth in the amount and availability of information. Indeed, the Massachusetts-based Enterprise Storage Group has observed a doubling of information every few months. Demand for easy and efficient access to this ever-growing amount of digital information is another certainty. For example, World Wide Web traffic increased 300% in 2001 according to Forrester Research. Included among the applications that continue to make the greatest demands are systems for processing:

financial transactions;

"click stream" data that encapsulates the behavior of visitors to web sites;

data relating to the operational status of public utilities such as electric power networks, communications networks, transportation systems and the like;

scientific data supporting drug discovery and space exploration.

Greg Papadopolous, the Chief Technical Officer of Sun Microsystems, Inc., has observed that the demand for access to decision support databases, referred to as the Input/Output (I/O) demand growth, doubles every nine months. To put this in context, Moore's Law predicts that Central Processing Unit (CPU) power doubles only about every 18 months. In other words, the demand for access to information is growing at least twice as fast the ability of a single CPU to process and deliver it.

In a typical general purpose data processing system, data is stored on one or more mass storage devices, such as hard disk drives. One or more computers are then programmed to read data from the disks and analyze it—the programs may include special database software written for this purpose. The problem with a general purpose system architecture, however, is that all the data must be retrieved from the disk and placed in a computer's memory, prior to actually being able to perform any operations on it. If any portion of the data retrieved is not actually needed, the time spent fetching it is wasted. Valuable time is thus lost in the process of retrieval and storage of unnecessary data.

The speed at which the data analysis can be performed is typically limited to the speed at which the entire set of data can be transferred into a computer's memory and then examined by the CPU(s). Usually, the aggregate data transfer rate of the disks does not govern the speed at which the analysis can be performed. Disks are inexpensive, and as such, data can be spread across a large number of disks arranged to be accessed in parallel. The effective data transfer rate of a set of disks, collectively, can therefore be almost arbitrarily fast.

The bandwidth of an interface or communications network between the disks and the CPUs is also typically less than the aggregate data transfer rate of the disks. The bottleneck is thus in the communications network or in the CPUs, but not in the disks themselves.

It has been recognized for some time that achieving adequate performance and scalability in the face of vast and rapidly growing data thus requires some kind of system architecture that employs multiple CPUs. The three most prevalent classes of so-called multiprocessing systems today include:

Symmetric Multiprocessing (SMP)

Asymmetric Multiprocessing (ASMP)

Massively Parallel Processing (MPP)

But even these approaches have weaknesses that limit their ability to efficiently process vast amounts of data. to each of the processors. The processors in an SMP system thus constitute a pool of computation resources on which the operating system can schedule "threads" of executing code for execution.

Two weaknesses of the SMP approach impair its performance and scalability when processing very large amounts of data. The first problem results from a limited ability to actually provide information to the processors. With this architecture, the I/O subsystem and the memory bus are shared among all processors, yet they have a limited bandwidth. Thus, when the volume of data is too high, the speed of the processors is wasted waiting for data to arrive. A second problem with the SMP approach is cache coherence. Within each processor is typically a cache memory for storing records so that they may be accessed faster. However, the more that processors are added to an SMP system, the more that time must be spent synchronizing all of the individual caches when changes are made to the database. In practice, it is rare for SMP machines to scale linearly beyond about 64 processors.

Asymmetric Multiprocessing (ASMP) systems assign specific tasks to specific processors, with a master processor controlling the system. This specialization has a number of benefits. Resources can be dedicated to specific tasks, avoiding the overhead of coordinating shared access. Scheduling is also easier in an ASMP system, where there are fewer choices about which processor to assign to a task. ASMP systems thus tend to be more scalable than SMP systems. One basic problem with asymmetry is that it can result in one processor being overloaded while others sit idle.

Massively Parallel Processing (MPP) systems consist of very large numbers of processors that are loosely coupled.

Each processor has its own memory and devices and runs its own operating system. Communication between the processors of an MPP system is accomplished by sending messages over network connections. With no shared resources, MPP systems require much less synchronization than SMP and ASMP systems.

One weakness of the MPP model is that communication among processors occurs by passing messages over a network connection, which is a much slower technique than communication through shared memory. If frequent inter-processor communication is required, then the advantages of parallelism are negated by communication latency. Another problem with the MPP approach is that traditional programming models do not map cleanly onto message passing architectures. Using approaches such as Common Object Request Broker Architecture (CORBA), which are designed to handle message passing, are considered awkward by some designers.

There have also been attempts over the years to use distributed processing approaches of various types. These began with proposals for "Database Machines" in the 1970s, for "Parallel Query Processing" in the 1980s, and for "Active Disks" and "Intelligent Disks" in the last five to ten years. These techniques typically place a programmable processor directly in a disk sub-assembly, or otherwise in a location that is tightly coupled to a specific disk drive. This approach pushes processing power towards the disks, and thus can be used to reduce the load on a host computer's CPU.

More recently, system architectures have been adopted for parallel execution of operations that originate as standard database language queries. For example, U.S. Pat. No. 6,507,834 issued to Kabra et al. uses a multi-processor architecture to process Structured Query Language (SQL) instructions in a publish/subscribe model such that new entries in a database are automatically processed as added. As explained in the Abstract of that patent, a first processor is used as a dispatcher to execute optimized queries, setup communication links between operators, and ensure that results are sent back to the application that originated the query. The dispatcher merges results of parallel execution by other processors to produce a single set of output tuples that is then returned to a calling procedure.

SUMMARY OF THE INVENTION

Brief Description of a Preferred Embodiment

In a preferred embodiment, the present invention is a data processing system having two or more groups of processors that have attributes that are optimized for their assigned functions. A first processor group consists of one or more host computers, which are responsible for interfacing with applications and/or end users to obtain queries, for planning query execution, and for, optionally, processing certain parts of queries. The hosts in the first group may be SMP type machines. A second processor group consists of many streaming record-oriented processors called Job Processing Units (JPUs), preferably arranged as an MPP structure. The JPUs typically carry out the bulk of the data processing required to implement the logic of a query.

Functions of the host computers in the first group can be divided into a "Front End" and an "Execution Engine". The Front End is responsible for parsing queries, generating query execution plans, optimizing parallelizing execution plans, controlling transactions, sending requests for processing to the Execution Engine and receiving results of such requests from the Execution Engine. The Execution Engine is responsible for scheduling the execution of jobs and other operations to run on the JPUs or locally within the Execution Engine itself, (such as sorting, grouping, and relational joining).

Each of the JPUs in the second group typically include a general purpose microcomputer, local memory, one or more mass storage devices, and one or more network connections. The JPUs preferably use a multi-tasking operating system that permits multiple tasks to run at a given instant in time, in a priority-based demand scheduling environment.

The JPUs are responsible for:
receiving data processing requests from the hosts in the form of jobs, retrieving data items from disk or other data sources, and other tasks such as local transaction processing, concurrency control and replication;
communicating results back to the first Execution Engine; and
occasionally communicating with other second group components.

In a preferred embodiment, each JPU also has a special purpose programmable processor, referred to herein as a Programmable Streaming Data Processor (PSDP). The PSDP acts as a storage controller, to serve as an interface between the CPU of a JPU and the mass storage device. The PSDP is a processor that is distinct from the more general purpose CPU in each JPU. It is also distinct from the CPU of the "host" in the first group.

The PSDP can be implemented as a Field Programmable Gate Array (FPGA), as in the preferred embodiment, or as an Application-Specific Integrated Circuit (ASIC), a fully-custom Application Specific Standard Product (ASSP), or even as discrete logic on a printed-circuit board. It can also be included in an integrated processor (i.e., a CPU that includes peripheral interface logic) on a single chip or in a single package, or it can be included with the circuitry of the mass storage device.

In addition to assisting the JPU in accessing data, the PSDP is specially programmable to also interpret data in a specific format as it is read from or written to the associated disk(s). This enables PSDP to perform portions of jobs on data directly, as it is read off the disk, prior such data ever being forwarded to the JPU.

In an embodiment specifically adapted for processing of record-oriented data, data can be filtered by the PSDP as records and fields of a database, so that only certain records, or certain portions of records, are actually forwarded to be written into the associated JPU's main memory.

However, many other operations beyond simple filtering are possible to implement in the PSDP. For example, records with certain characteristics can be tagged as they are written in the JPU's main memory, to indicate that such records are to be ignored in further processing, or to indicate certain attributes of such records, such as if they are to be handled differently in a transactions from other records.

While of use in processing field-oriented database records, it should be understood that the particular invention can also be used to advantage in processing many different types of data, including other field delimited data such as tables, indices, and views. The system is also advantageously used to process less structured data such as character strings, Binary Large Objects (BLOBS), XML, graphics files, and the like.

Discussion of Advantages

A number of advantages result from this architecture.

First, unlike prior art database machines that integrate special processing hardware into the disk assembly itself (e.g. on the heads, on the arms, or electronically nearby), the JPUs in the second group use the special purpose PSDP hardware to interface to a disk and filter data after it reads from a disk, but still prior to a more general purpose execution unit. As a result, the system designer may now use industry standard disk controllers and standard hard disk drives. This allows the designer to effectively leverage the ever increasingly higher density of standard IDE and SCSI compatible storage media, as soon as they become available.

Second, like the custom controller approach, any need to first read records into memory locations prior to performing any operation on them is still avoided. But when only a fraction of the available data is relevant to a query, the PSDP avoids inefficiencies of other approaches that:

allocate memory for unused information
    waste time copying unused information into memory
    waste time stepping around unused information The PSDP avoids these problems since database filtering operations are performed "on the fly" in a streaming fashion, as data is read as records stream out of the mass storage devices.

In a preferred embodiment, the PSRP can also be programmed perform operations such as Boolean comparisons of record field values against either literal values or other record field values, or values held in registers of the processing element, and reject records that fail these Boolean comparisons before they are stored in memory. Of the records that pass the filtering conditions, the PSDP element can thus additionally filter out the subset of fields that are irrelevant to a particular query.

In addition to field-level record filtering, the PSDP also can perform other operations on records as they are read from mass storage. For example, the PSDP can be programmed to decompress records entering memory and to compress records being sent out of memory. It can be instructed to decrypt records entering memory or to encrypt records being sent out of memory. It can convert lowercase fields to mixed or uppercase. It can, in fact, be programmed to perform myriad other such operations. Because these operations occur as each record streams into memory, the PSDP offloads such tasks from the JPUs main CPU, freeing it for other useful work.

Other advantages result if the PSDP is programmed to perform simple Boolean operations, such as to compare field values of the record stream against values held in its local registers. This allows a limited class of join operations to be performed of records before they are stored in memory. For example, if the values of the fields being joined are limited in range (such as when a set of consecutive integers is used to represent each of the 50 United States), the presence or absence of a particular field value can be encoded as a bit within a sequence of bits, whose position within the sequence corresponds to the integer field value.

One advantage of this is that it allows field-level filtering and more complex processing to proceed in parallel within the JPU, for additional performance benefit. A more important advantage is that this configuration of processors is most effective at reducing the amount of data that must flow through the system.

In essence, by using a PSDP that is dedicated to performing as much field-level filtering as possible before records are stored into the JPU's memory, the JPU's CPU is thus free to perform as much record processing as possible before it must return records over the network (for aggregation with the results of other JPUs) into a final reply to the SMP host. Because moving vast amounts of data requires much overhead, it is advantageous to add a dedicated processing element before each step in the data movement pathway, from input to final result.

The JPU/PSDP architecture, in effect, separates streaming record processing from other query processing functions. Because the PSDP can be programmed to recognize record formats, it is capable of producing tuple sets as an output. As a result, after data leaves the PSDP, it can always be handled in tuple set form. This permits very fast handling data procedures to be implemented, because a consuming operation (be it in the JPU or the host) never has to process a block of undifferentiated binary data.

Additionally, since there can now be one common data handling paradigm throughout the system, i.e., the streaming tuple set, all functions such as storage, network, data operations, and transaction operations can efficiently and consistently use the tuple set model. Therefore, any operation may be arranged to take as input(s) the output(s) from any other operation. Also, a common set of algorithms may be used for all operations whether on the host(s) or JPUs.

This is in contrast to most database systems, which may materialize data as blocks of binary information that needs to be parsed by differing operations; which use different paradigms for network, storage, and internal operations; and which are unable to stream efficiently because of those different paradigms.

The two group architecture also allows an application to be insulated from the details of the programming model of the JPU. The application interacts only with the first group, and the first group translates the application's requests into requests against the JPU. This approach has several advantages:

changes are easily made to functionality because of the inherent modularity of the system;

any step of a query may be optimally executed on either of the groups or a combination thereof;

bugs in application code cannot cause data corruption, crashes, or affect the requests of other applications;

so that queries written in existing standard languages using existing Application Programming Interfaces (APIs) will run correctly while gaining the performance advantages of the invention; and requests to the JPU can be made large enough to amortize the cost of the network communication, so that the performance benefits of parallelism are not lost to network latency.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A. System Level Architecture

1. First Group Components

The present invention is a data processing system having at least two "groups" of processing units, in which the individual components of each group are individual network "nodes" within the system. As will be explained in detail below, the present invention has to do with how the a first group of one or more host processors accepts and responds to queries for data, and transforms such queries into one or more jobs, a second group of nodes comprising one or more Job Processing Units (JPUs), wherein. each JPU has a streaming data interface, for receiving data from a streaming data source, one or more general purpose CPUs, for responding to requests from the host computers in the first group, and one or more Programmable Streaming Data Processors (PSDPs), which perform primitive functions directly on data received from the streaming data interface.

Figure 1:
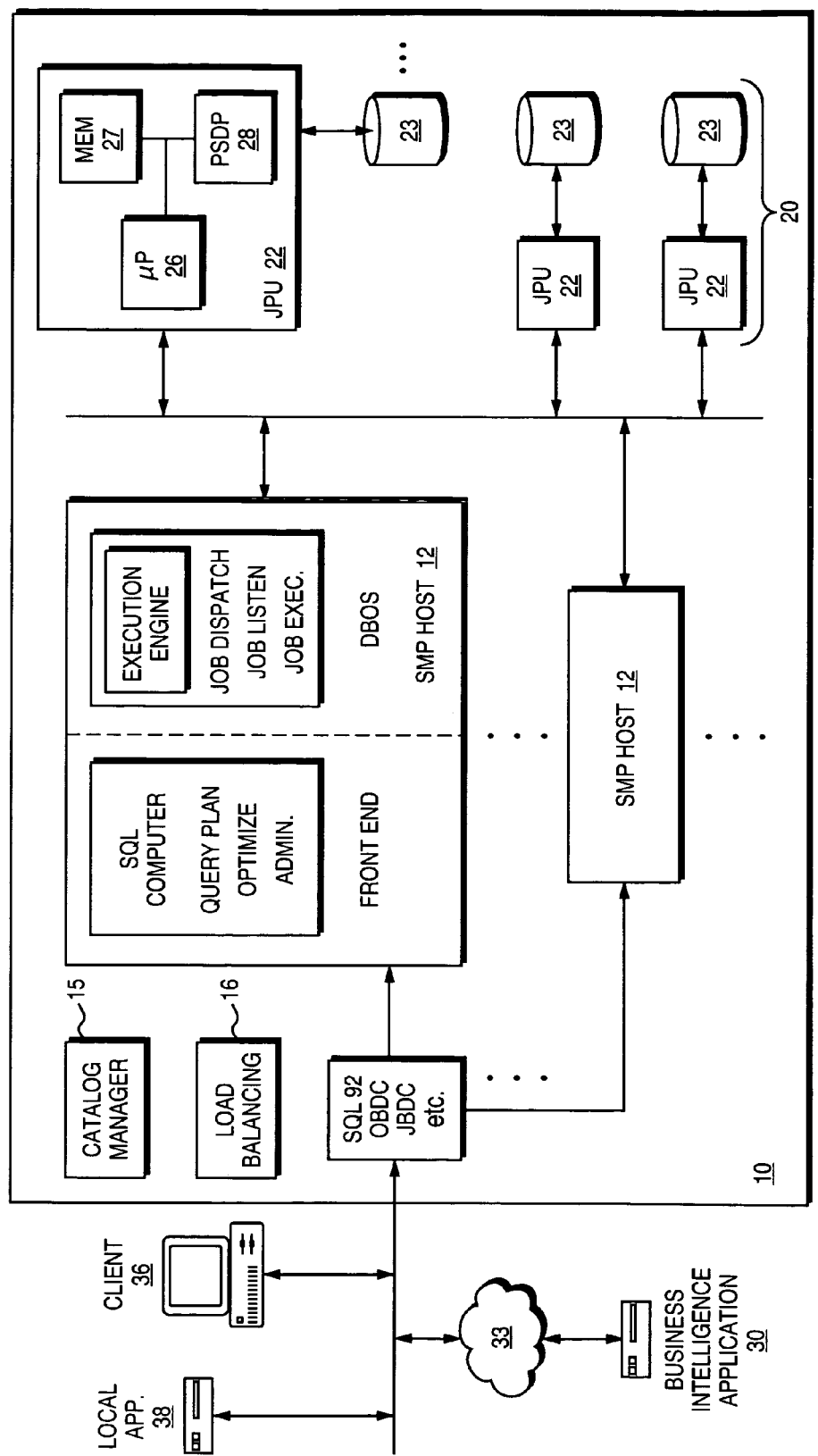
FIG. 1 is a system level block diagram of an asymmetric record processing system according to the present invention.

As more particularly shown in FIG. 1, the first group 10 consists of one or more SMP "host" computers 12, each with its own memory, network interface, and local storage (not shown in FIG. 1). Each host 12 runs its own operating system, and typically, but not necessarily, each host 12 uses the same type of operating system as the other hosts 12.

The hosts 12 typically accept queries that are requests for data stored on mass storage devices, such as hard disk drives 23. The requests may originate from any number of business intelligence applications that may be residing on local processors 28 or client computers 36 or separately running application software 30, that may originate through a computer network 33 or locally. Queries are typically provided in a format such as Structured Query Language (SQL), Open DataBase Connectivity (ODBC), Java DataBase Connectivity (JDBC), or the like.

The hosts 12 accept queries that can retrieve, modify, create and/or delete data stored on disk 23 and the schema for such data. The hosts 12 also accept requests to start, commit, and rollback transactions against the data. The hosts 12 also perform typical administrative functions such as reporting on the status of the system 10, start and shutdown operation, backing up the current state of the data, restoring previous states of the data, replicating the data, and performing maintenance operations.

Optionally, there is a load balancing function 11 in front of the host 12 processors, which directs individual transactions to specific host or hosts 12 so as to evenly distribute workload.

A catalog management component 15 contains descriptions of the fields and layout of data. Catalog management 15 also contains information about which users and applications have which permissions to operate in which ways on which types of records, datasets, and relations. The various hosts 12 interact with catalog management 15 in order to process the requests they receive. In one embodiment, catalog management 15 is embedded within one of the hosts 12, with parts replicated to the other hosts 12 and second group 20 components. As will be understood shortly, the catalog manager provides information to permit the components of the second group 20 to perform filtering functions.

With the exception of their need to consult catalog management 15, the hosts 12 are generally able to respond to requests without having to communicate among themselves. In very rare instances, inter-host 12 communication may occur to resolve a transaction sequencing issue.

2. Second Group Components

Figure 2:
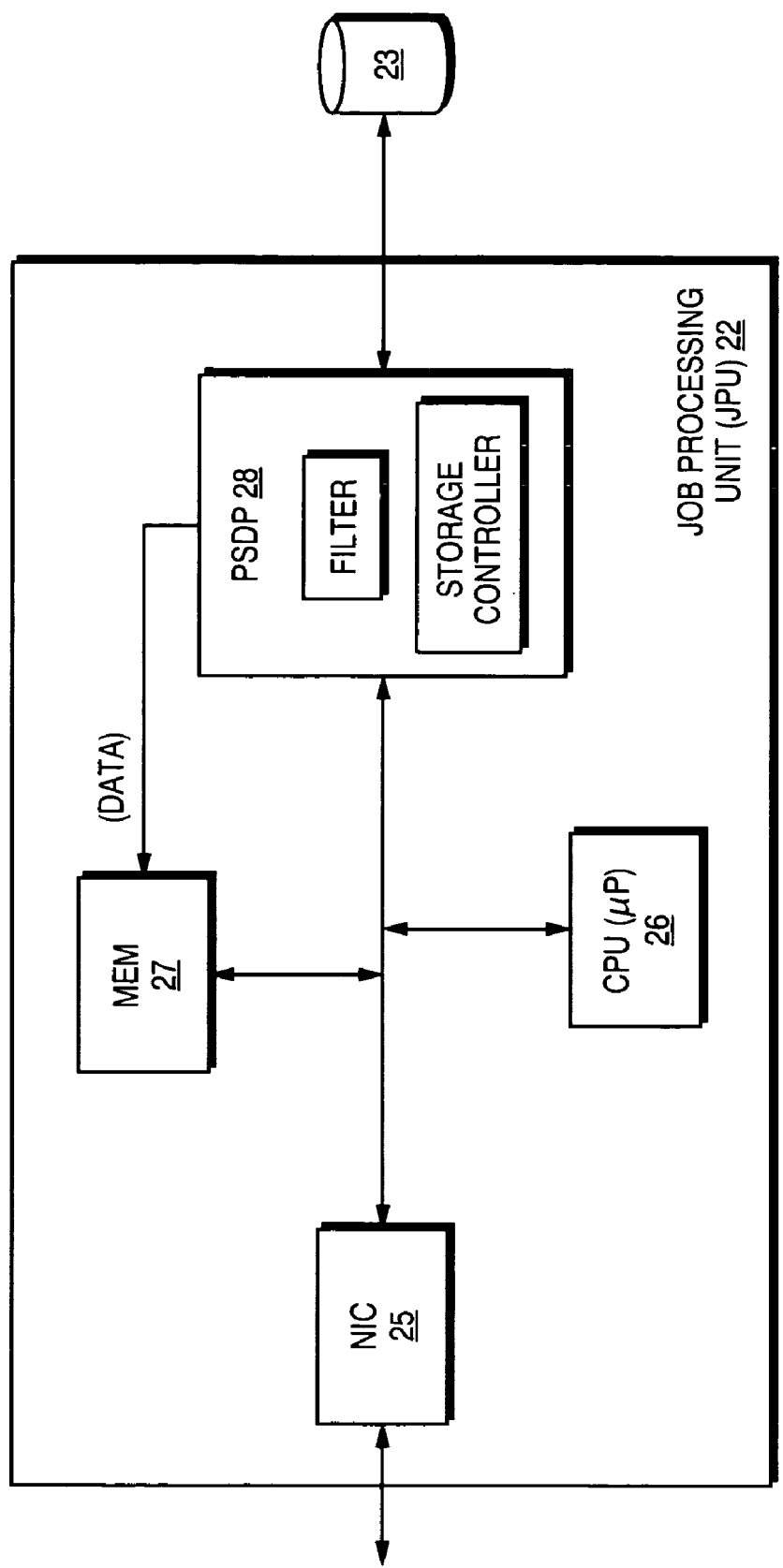
FIG. 2 is a more detailed view of a Job Processing Unit (JPU).

The second group 20 consists of a plurality of Job Processing Units (JPUs) 22. As shown in FIG. 2, each JPU 22 consists of a network interface 25 for receiving requests and delivering replies, a general purpose Central Processing Unit (CPU) 26 such as a microprocessor 26, memory 27, and a Programmable Streaming Data Processor (PSDP) 28. Each JPU 22 runs a multi-tasking schedule-based operating system. Each JPU 22 also has an attached disk 23 and disk controller from which the JPU 22 may read streaming data. In other embodiments, the JPU 22 can receive streaming record data from alternate or additional sources such as other on-board processors or via other network interfaces in place of the disk drives 23. Such streaming data might include stock quotes, satellite data, patient vital signs, and other kinds of "live-feed" information available via a network connection.

The JPU 22 accepts and responds to requests from host computers 12 in the first group 10 to process the streaming record-oriented data under its control. These requests are typically "jobs" of a larger query, and are expressed as sequences of primitive operations on an input stream. The primitive operations could be interpreted, but in the preferred embodiment, they are packaged as compiled code that is ready for execution. An exemplary job-based query is described in more detail below.

In addition to processing jobs, a JPU 22 also accepts and responds to requests from hosts for other operations such as:

Start, pre-commit, commit, abort, and recover transactions

Perform mirroring or other replication operations

Start, initialize, reinitialize, stop, and retrieve status information

Create, modify, or delete descriptions of records, indices, views and other metadata Each JPU 22 also accepts and responds to requests from the hosts 12 to:

Perform mirroring or other replication operations

Redistribute data from one JPU to another

Send data local to one JPU to another JPU to help process a query job

Send data to a logging device

Send data to a replication device

Acknowledge the successful completion of an operation requested by another node.

JPU(s) 22 typically use multi-tasking Operating System (OS) to allow receiving, processing, and reporting the results from multiple jobs in a job queue. The OS should also support overlapping job execution. To coordinate this, the OS typically is responsible for scheduling and prioritizing requests according to a number of factors that are determined in real time. These may include a job priority as assigned by the user and/or host 12, as well as a job's expected impact on the JPU's 22 local resources includes the amount of memory, disk, network, and/or I/O queues needed to complete the job. The JPU 22 can also contain software for performing concurrency control, transaction management, recovery and replication of data for which the JPU is responsible.

JPUs 22 in the second group 20 are not directly visible or accessible to the users of, or the applications that run on, for example, the clients 36 or business intelligence applications 30 that present queries to the system 10. The JPUs are, instead, an embedded component that maintain significant autonomy and control over their own data. A given record (or other data primitive) in the system 10 is thus normally directly accessible to, and processed by only one JPU 22. While JPUs may replicate their records to increase reliability or performance, they do not share responsibility for processing a given record with other JPUs 22 when carrying at a job as part of a query. More details of this autonomous, asynchronous nature of the JPU's can be found in the above referenced co-pending U.S. Patent Application entitled "Programmable Data Streaming Architecture Having Autonomous and Asynchronous Job Processing Unit."

The storage manager 320 within each JPU 22 provides support for other functions such as error checking, creation and deletion of tables, the use of indices, record insert and delete, mass loading of existing user data among various JPUs, and the like.

Throughout the system, the components and sub-components are designed to optimize performance thru extensive use of streaming operations coupled with tuple set operations. As will be understood shortly, most operations are designed to take tuple sets (records or groups of records) as their input and output streams; these operations try not to materialize data, but instead they stream the output to the next operation. As a consequence many operations can be handled as one continuous data flow, whereas in a conventional system, it would be necessary to handle them in various layers.

For instance, a storage layer can be designed as a tuple set manager where (from the view of other JPU processes) it stores and retrieves tuple sets. From the storage layer onward, data is normally handled in tuple sets, providing a consistent, well organized, and easily accessible format for internal operations. This is in contrast to other systems where the storage layer stores and retrieves undifferentiated blocks of data which are later converted to tuple sets by some other downstream process. Another example of the streaming/tuple set architecture is the network layer, which sends and receives tuple sets instead of blocks of data.

Yet another example is a merge aggregation mode, where a sorted data stream is aggregated as requested, and whenever a new key index value is received, the aggregation from the previous key index value may be streamed to the next node.

A streaming/tuple set operation can be illustrated by tracking a typical dataflow during a load operation. In this example load case, as data is read into a host 12 over TCP/IP network connection 32, that data is parsed, error-checked, and transformed, and the distribution value calculated, all while the specific byte/field is in processor cache, and saved to the internal network output frame buffers as one step. The result is that the input data is read/transformed in a streaming fashion and converted to network-ready tuple set packets at streaming speed with minimal overhead. As each packet is received, it is sent over the internal network 34 to an appropriate JPU 22 (as determined by the a distribution value in a Query Plan). At the JPU 22, the received data is read, converted into an approved storage format, and placed in memory buffers on a record-by-record basis. As memory buffers are filled, a storage layer in the JPU double-checks that the data corresponds to the indicated table, and that the table "owns" the physical space on the disk 23, and then writes that data to the disk 23. Note that during this process, a given byte of data was "touched" only a few times, and that the data was manipulated in tuple sets thereby optimizing performance and reliability.

A second illustration of a streaming tuple set operation is a join/aggregate operation where three joins and one co-located aggregation are performed on JPUs 22, and the results are returned through the host 12 via ODBC to the ODBC client 36 (e.g., Business Objects).

In this example, on each of three JPUs, the disk 23 is scanned and data read off the disk through the associated PSDP, which filters records of interest and fields of interest within those records, and places the resulting tuples into a tuple set buffer in JPU memory. As each tuple set buffer is filled, that tuple set is passed through each of three JPU join nodes and the aggregate node in turn. Each time a new key value is received by the aggregate node, the previous aggregate value and associated key value tuple are transformed as necessary per the ODBC request, and placed in the JPU network packet output buffer associated with the requesting host 12. When a network packet output buffer in the JPU is filled, its contents are sent to the host 12, where it is immediately placed in the user-side network buffer and is immediately sent to the ODBC client 36.

Note that, as in the previous example, the data was "touched" only a few times. Because the data was handled in tuple sets, it could be operated on as integral units with very minimal overhead. Because the operations are extremely integrated, mixed operations such as joins, aggregates, output transformation, and network packet creation are all performed while the data is in processor cache memory.

More information regarding the streaming nature of data transfer can be found in the above referenced co-pending U.S. Patent Application entitled "Asymmetric Streaming Record Data Processor Method and Apparatus,".

B. Host Software Functions

FIG. 2 is a software component diagram for a host 12. A summary description of the functional blocks and their interactions now follows. This list is intended here to be an introduction to a more detailed description of how a query is processed into a set of jobs that can then be carried out as synchronously and autonomously by JPUs 22.

Postmaster 201
  Serves as Front-end for query processing
  Postmaster 201 accepts requests from user applications via API 200
  Creates an Execution Plan
  May use authentication Plan Generator 204
  Parse/query rewrite/planner—plans how query will be processed.
  Supports SQL-92 DDL/DML
  Supports SQL Functions
  Provides compatibility with Oracle, SQL Server
  Integrated with SQL triggers, stored procedures Plan Optimizer 205
  Cost-based optimizer, with the addition of locale costs which optimizes for most efficient operation/highest level performance
  Indicates which operations will be done within host and which will be done within JPU
  Communicates with Plan Link, providing tips on what filtering should be done within the Programmable Data Streaming Processing ("PSDP") if there are multiple filters that can be done there (more than the PSDP can handle)
  Maintains usage/reference statistics for later index creation, refreshing cluster indices Plan Link 206
  Takes an Execution Plan as input
  Analyzes Execution Plan and splits plan further, identifying what will be done within the PSDP 28, what will be done within the JPU 22 after the PSDP 28 has returned its data to the JPU 22, and what will be done in the Host 12 after the JPU 22 has returned its data SQL Expression Evaluator/SQL Converter 207
Expression Evaluator
Creates object code for evaluating given expression to be executed on the Host, JPU, and PSDP based on the expressions, their type, and the capabilities of the installed hardware Host Dispatch 208
Similar to standard UNIX scheduler/dispatcher
Queues execution plan and prioritizes based on (a) the plan's priority, history, and expected resource requirements, and (b) available resources and other plans' requirements
Controls number of jobs being sent to any one JPU 22 to avoid JPU Scheduler or JPU memory overload
Sends Host jobs to host execution engine Communications Layer 210
Provides communications among the nodes
Includes Job Listener to await data from nodes
Uses striping data from a Topology Manager to direct multicast and unicast messages
Detects non-responsiveness of nodes and communicates with Topology Manager to trigger failover processing Call Home 212
Initiates message to a Technical Assistance Center (not shown) to identify failed part and trigger service call or delivery of replacement component (as appropriate given user support level)
Optionally communicates via SNMP to a defined app to receive a failure indicator and callhome trigger
Logs error(s)

Logger/Replication Server 218
Logs transaction plans, messages, failures, etc. to Netezza log in conventional fashion
Implemented as a standard transaction logger/replication server System Manager 220
Defines and maintains JPU Configuration information, striping information
Mirror Master—maintains mirrors info—what JPUs are being mirrored where, maintains SPA data, maintains info on system spares
Initiates failover processing when informed by Comm layer of a non-communicative JPU—directs mirror of failed JPU to take over as primary and begin copying to designated spare, directs primary of JPU mirrored on failed JPU to copy its data to that same designated spare, to reduce load on mirror of original failed JPU also directs mirror of the primary on that failed JPU's mirror to do double duty and act as new primary until failover copying has been completed
Communicates to callhome component to initiate replacement process
Manages system expansion and allows for redistribution of data as appropriate or as requested by user during expansion
Initiates JPU diagnostics when appropriate
Provides an API to allow client management interface to get configuration data for user display/control Host Diags 226
Runs diagnostics on Host as required/requested Loader 230
Provides fast loader capability for loading user data onto disks
Communicates directly to Host Dispatch to load database/insert records
Communicates with System Manager to get configuration and mirroring data
Controls index creation on primary (and sets up job to run later to create indices on mirror)
Supports input via a number of methods (e.g., tab-separated data, backup/recovery)
Does ETL, converts data from Oracle, SQL Server, DB/2, etc. to the internal data format MOX/OLAP 240
Provides OLAP/MDX, ROLAP Engine on Host
Creates and maintains MOLAP cubes
Supports multi-user MDX
Creates Execution Plans for OLAP requests and communicates these directly to Host Dispatch
Supports metadata writeback
Provides administrative support for user creation, security
Access System Catalog through API Cube Builder User Interface (UI) 242
Provides interface for defining and managing cubes to be used in OLAP Processing JPU Downloader 250
Downloads Firmware to System JPUs 22 at system initiation/boot
Downloads PSDP 28 and JPU 22 images
Communicates with System Manager to understand number of JPUs and JPU configurations
Initializes spares for failover
Initializes replacements Host Disk Manager 250
Manages Host Disk (used for Catalog, Temp Tables, Transaction Log, Netezza Log, Swap space)

Host Event Handler 252
Receives partial record sets from JPUs 22 through the Comm Layer Job Listener
Executes remainder of Execution Plan that has to be done at Host 12
Provides intermediate and final sort-merge of JPU 22 sorted data as required
Handles joins of data returned from JPUs 22 as required
Communicates to JPUs through Comm Layer 260 to request partial result sets from JPU buffers when idle (e.g., to get and sort/process partial records that the JPU currently has instead of waiting for JPU 22 to fill a buffer and then send to Host 12

Host Transaction Manager 264
Manages transactions on the host 12
Controls requests sent to JPUs 22 that will be involved in the transaction
Provides lock management and deadlock detection
Initiates abort processing
Sends state data to Recovery Manager 266
Sends ID requests to the Transaction I.D.(TID) Manager 268
Provides transaction IDs and deleted transaction IDs to ensure that disk records are preceded Manages catalog requests as transaction requests as required TID Manager 268
Provides unique transaction identifiers (TIDs)
Coordinates with other hosts to avoid generating duplicate TIDs Host Recovery Manager 266
Ensures transaction atomicity after component (e.g., JPU) failure
Maintains journal of transaction state
Initiates rollback as required Backup/Recovery 270
Supports Host side of Backup/Recovery process
Interfaces with Transaction Manager and JPU Storage Manager

C. JPU Software Components

Figure 3:
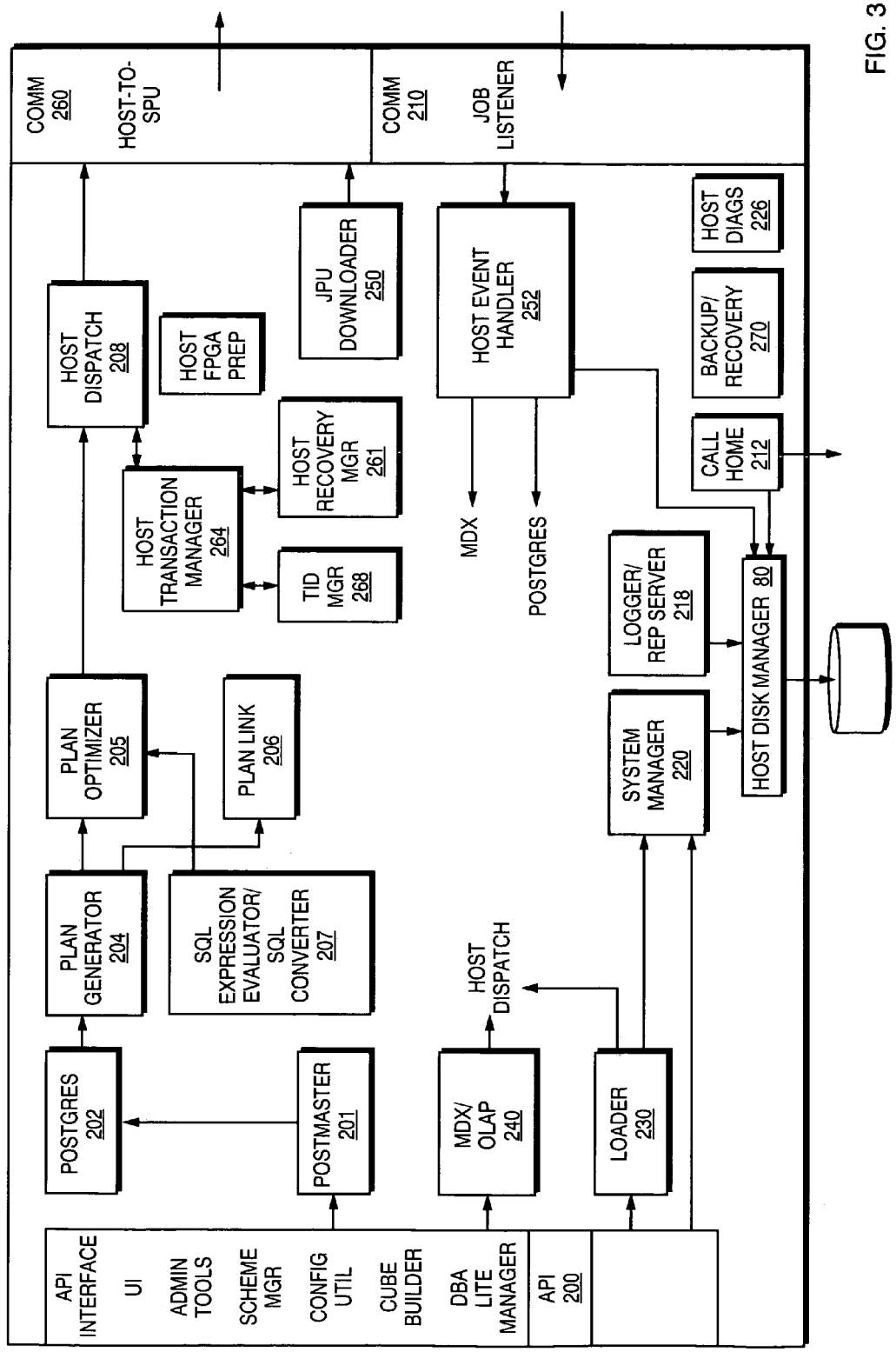
FIG. 3 is a more detailed view of software components in a host.

FIG. 3 is a diagram of the software components of a JPU 22.

Communications Layer 300
Provides internal communication among nodes
Includes Job Listener 301 to await requests
Includes Network Poster 302 to send data when buffer filled, job completed, or at Host request JPU Dispatch/Scheduler 304
Receives plan through Communications Layer 300
Queues Plan
Schedules/dispatches jobs according to their priority, "fairness" to date, expected resource requirements, and available resources JPU Transaction Manager 306
Processes changes in transaction state to begin a transaction, pre-commit a transaction, commit a transaction, or abort a transaction
Handles processing of dependencies among transactions as flagged by the lock manager; broadcasts information about these dependencies to relevant host(s); initiates deadlock checks JPU Lock Manager 308
Controls concurrent access to data
Interfaces with EventTask 36 before a query is executed and for each result set returned from a scan
Provides support for arithmetic locking JPU Recovery Manager 312
Maintains a Journal to track transaction status on the JPU 22, using the Storage Manager API
Performs transaction recovery when requested by JPU Transaction Manager JPU Mirror Manager 314
Mirror Sender receives copies of record updates from Storage Manager 320 and transmits these to the mirror for this JPU when an updating transaction commits
Mirror Receiver receives record updates, buffers these in memory, and flushes out to disk through the Storage Manager when the Mirror Receiver buffer is full
Transmits all data to a spare system during failover processing Storage Manager 320
Stores and manages information on disk in optimal fashion
Has an API that supports storage and retrieval of tuple sets
Supports error checking to insure that the data conforms to the indicated table and the indicated table "owns" the physical space to which the data is being written
Supports creation and deletion of tables, views, and indices
Handles record inserts and deletes
Supports ETL and mass loading of existing user data
Provides storage support for commit/rollback
Provides support for Precise Indexes
Provides mirroring support for failover
Optimizes sort operations and utilizes smart hash algorithm for data distribution/striping
Provides support for compression and smart storage optimization
Controls disk I/O JPU Resource Scheduler 322
Schedules jobs to run on the PSDP 28; communicates with JPU/PSDP Scheduler 324 to queue up PSDP requests to retrieve required data
Optimizes the queue to keep the PSDP/disk as busy as possible, with requests from multiple queries intermixed in the queue based on disk characteristics and location of data on the disk
Takes into account the needs of any data loading for new tables being created and transformed to internal data format (i.e., to optimize the loading process)
Supports heuristic-based scheduling, ensuring that jobs are scheduled on a priority basis, but also ensuring that all jobs do get serviced (e.g., raising a job in priority if it has not been run in a certain interval of time)
Supports synchronous/piggy-backed scans, combining similar requests to optimize PSDP processing
Manages memory buffers/memory allocation on JPU; allocates memory to Execution Plans based on expected needs and hints received from Plan Optimizer
JPU Paging (if required)

PSDP Prep 330
Defines the instructions that will be given to the PSDP 28 in order to process a request (instructions tell the PSDP 28 what to do with each field being read from the disk)
Identifies what filtering, transformation, projection, and aggregation operations are to by run by the PSDP 28

EventTask 310
Executes the portion of the Execution Plan that could not be handled by the PSDP but that does not have to be handled at the Host level
Handles sorts, joins, transformations, and aggregations that could not be done as data stream through the PSDP 28
Maintains a memory buffer of result set records and returns these to Host through the Comm Layer when buffer filled, job completed, or at Host request JPU Diags 332
Runs diagnostics on JPU as required/requested JPU Boot/Init 334
Executes image burned into flash memory at boot time to bootstrap the JPU, run diagnostics, register the JPU with the primary Host server, and download new image from Host to run
Loads and transfers control to the image downloaded from the primary Host server to load the JPU application code, the operating system, the network stack, and disk driver code Backup/Recovery 336
  Supports JPU side of Backup/Recovery process
  Interfaces with Transaction Manager and JPU Storage Manager
DBA Lite 338
  Provides automatic and dynamic disk and Storage Manager support
  Supports dynamic index creation, defragging, index garbage collection, timers, agents
JPU/PSDP Scheduler 324
  Schedules jobs to run on the PSDP; queues up PSDP requests to retrieve required data

D. Detailed Description of PSDP Architecture

As discussed above, the PSDP allows data to be processed during Direct Memory Access (DMA) disk read operations. There are many different possible operations that can be performed by the PSDP 28, including transforming and comparing data with other data or with constants.

PSDP 28 functions fall into two general categories: disk driver logic interface 281 and data "filter" 282. Each of these functions is described in some detail below. It is sufficient here to note that the disk driver logic interface 281 accepts standard disk drive interface signaling, such as IDE (Integrated Device Electronics) or SCSI (Small Computer Systems Interface), adapting it to a particular CPU native "bus" such as a Advanced Technology Attachment (ATA) bus or the like. Alternatively, if there is a communications network, such as Ethernet or Fibrechannel, instead of array of disks 23 to provide access to input data stream(s), the interface 281 becomes a network interface that is suitable to receive and/or transmit data over a communications network. The disk driver logic 281 is usually implemented in an Integrated Circuit (IC) in a computer or communications device, in or part of an IC that contains other logic, such as other interface logic or the CPU 26 itself. The disk driver 281 can even be inside the disk 23 itself, making the disk a special-purpose unit attachable only to JPUs or communications devices for which the interface is specific.

In the preferred embodiment, the PSDP 28 is however an Integrated Circuit (IC) that interfaces a standard disk 23 to a peripheral bus of the JPU 22. All such controllers have the basic function of allowing the CPU 26 in the JPU 22 to read and write the disk 23, typically by setting up long data transfers between contiguous regions on the disk and contiguous regions in the CPU's 26 memory, a process usually referred to as Direct Memory Access (DMA).

The PSDP 28 also provides programmable hardware directly in the disk read path, to and from the controller. This function of the PSDP hardware, called the "filter" unit 282, is programmed to understand the structure of the data the analysis software running on the JPU 22 wishes to read and analyze. The PSDP 28 can be this programmed to operate on data as it is received from the disk 23, before it is stored into the JPU's memory, and in the process discard data that the JPU 22 would otherwise have to analyze. In an embodiment specifically adapted for processing of record-oriented data, data can be filtered by the PSDP 28 as records and fields of a database, so that only certain fields from certain records are actually forwarded to be written into the associated JPU's main memory.

Many other operations beyond simple filtering are possible however. For example, records with certain characteristics can be tagged as they are processed, to indicate that such records are to be ignored in further processing, or to indicate certain attributes of such records, such as if they are to be handled differently in a transactions from other records. Other, non-filter like processes can be implemented such as compression/decompression; encryption/decryption; simple join operations, and the like.

Thus, while the PSDP 28 of particular use in processing field-oriented database records, it should be understood it may process many different types of data, including other field delimited data such as tables, indices, and views; or less structured data such as character strings, Binary Large Objects (BLOBS), XML, graphics files, and the like. So although referred to herein as a "filter" unit that processes "records", it should thus be understood that filter 282 can also perform many other functions on various types of data, not just records.

As one example of filtering record-oriented data, the PSDP 28 can be programmed to recognize that a certain set of records in a database have a specified format, for example, a preamble or "header" of determined length and format, perhaps a field including the length of the record, followed by data including some number of fields of a certain type and length (e.g., 4-byte integers), followed by some number of fields of a different type and length (e.g., 12-byte character strings), followed by some number of fields of variable length, whose first few bytes specify the length of the field in some agreed-upon manner, and so forth.

The filter unit 281 can then execute this program as it reads data from the disk 23, locate record and field boundaries, and even employ further appropriate Boolean logic or arithmetic methods to compare fields with one another or with literal value. This allows the filter unit 282 to determine precisely which fields of which records are worth transferring to memory. The remaining records are discarded, or tagged in a manner that signals the JPU 22 that a record need not be analyzed. Again, there will be more discussion of how this is done in detail below.

In the preferred embodiment, there are two basic reasons for which the filter unit 282 can discard a record (or mark it as unworthy of attention). The first is an analysis of the contents of the fields as described above. Using a previous example, the filter unit 282 can, for example, be programmed for a store sales database to check a purchase date field against a range of numbers that correspond to dates in the month of July in the year 2000, another field for a number or string uniquely associated with a particular store in North Carolina, another field for a set of SKU (Stock-Keeping Unit) values belonging to various styles or manufacturers of blue raincoats, and in this fashion mark only certain records for further processing. The filter unit 282 can further be programmed to know which fields contain the name and address of the customer who made the purchase, and return only these fields from the interesting records. Although other database software could perform these operations, the filter unit 282 can perform them at the same rate as the data is supplied by the disk 23. Far less data ends up in the JPU's memory as a result leaving the JPU 22 free for more complex tasks such as sorting the resulting list of names and addresses by last name or by postal code.

A second example of how the filter unit 282 can be used is to discard or mark a record, as in record creation and deletion in a multi-user environment. Databases are not static, and it is common for some users to be analyzing a database while others are updating it. To allow such users concurrent access to the database, records can be tagged with transaction numbers that indicate when or by whom a record was created or marked obsolete. A user querying a database may not wish to see records created by another user whose activity began subsequently, or whose activity began previously but is not yet complete; if so, he probably will want to see records marked obsolete by such a user. Or the user may wish to see only the results of transactions entered by certain users, or only the results of transactions not entered by certain users. To facilitate this kind of record filtering, record headers can contain creation and deletion identifiers that the filter unit 282 can be programmed to compare with the current user's identifier to determine whether records should be "visible" to the current user. Once again, the filter unit can avoid transferring useless data to memory or relieve the JPU 22 of a time-consuming analysis task.

In the preferred embodiment there are two basic methods the filter 282 unit can use to filter out data that is unnecessary for a given query, thereby reducing traffic on the communications network and reducing the workload on the JPU 22. As described above, the filter unit 282 can simply discard the data. This is not always practical, however. Imagine a very long record with many fields, or large fields, many of which are to be returned to the JPU 22. Further consider a situation where a record meets the criteria is arranged in such a way that the contents of the last field are relevant to the decision to transfer or discard the selected fields of the record. Practical implementations of the filter unit 282 may not be able to store ("buffer") the largest possible set of returnable fields in a very long record, since there will be a limit on local buffer size. In such a case, the filter unit must begin sending the selected fields to the JPU 22 before it can tell whether they actually should be sent. After the record has been completely processed by the filter unit, and all the selected fields transferred to the JPU 22, the filter can tag the transferred data with a states bit that says "never mind", thus saving the JPU 22 and the communications network a great deal of work. In practice, the filter unit can append a length indication to every record fragment it does transfer to the JPU 22, so that the JPU 22 can find the boundaries between the record fragments the filter unit deposits in memory. This is a natural place for this status bit (or bits, if the JPU 22 must distinguish among multiple reasons) indicating the transfer of a useless record.

In addition to selecting certain fields from certain records for transfer to the JPU 22, the filter unit 282 can create and return additional fields not present in the database, by performing calculations on the contents of the fields that are present. This can further relieve the JPU 22 of work. An example of this is the calculation of a "hash" function on the values of specified fields from a record, some of whose fields are to be transferred to the JPU 22. A hash function is a numerical key assigned to a collection of numeric or non-numeric field values that speeds up the process of searching through a list of records. Other examples of useful information that can be computed by the filter unit 282 include running sums or averages of field values from one record to the next. All of these benefits accrue from the filter unit's 282 ability to parse the data into records and fields as it transfers the data from the disk 23 to the JPU 22.

Another example is a transformation, such as an ASCII substitution. One usage for an ASCII substitution is to change the collation sequence of a given field. For example, if the LAST_NAME starts with the French 'ç' (ASCII 135) then the SQL clause "WHERE LAST_NAME IS>'H'" will erroneously fail unless 'ç' has been mapped to 'C' (ASCII 76). Similar issues involve the use of the UPPER( ) and LOWER( ) functions. In the preferred embodiment, the PSDP has 2 groups of registers, each 256 bytes. If transformation of a given field is selected then the PSDP setup loads transformation fields into these registers before the data is streamed in. Each register in the transformation fields corresponds to an extended ASCII value and the register contains the value that each extended ASCII character is to be converted into. In the example above, register number 135 contains the value 76. During the streaming phase, as each tuple streams through the PSDP, for those fields where a transformation is indicated, each byte is individually transformed to its converted value. Two registers are provided so that two types of transforms may be applied to different fields in a given stream, such as UPPER( ) and LOWER( ). The transforms may be applied either (a) in the "filter" path, before evaluation and comparisons or (b) in the "project" path so that a given field is converted before being output from the PSDP. This is especially useful for correcting collation sequences in preparation for the CPU performing a sort. More details of such a substitution table are contained in the above referenced co-peanding U.S. patent application entitled "Field Oriented Pipeline Architecture for a Programmable Data Streaming Processor,".

Figure 5:
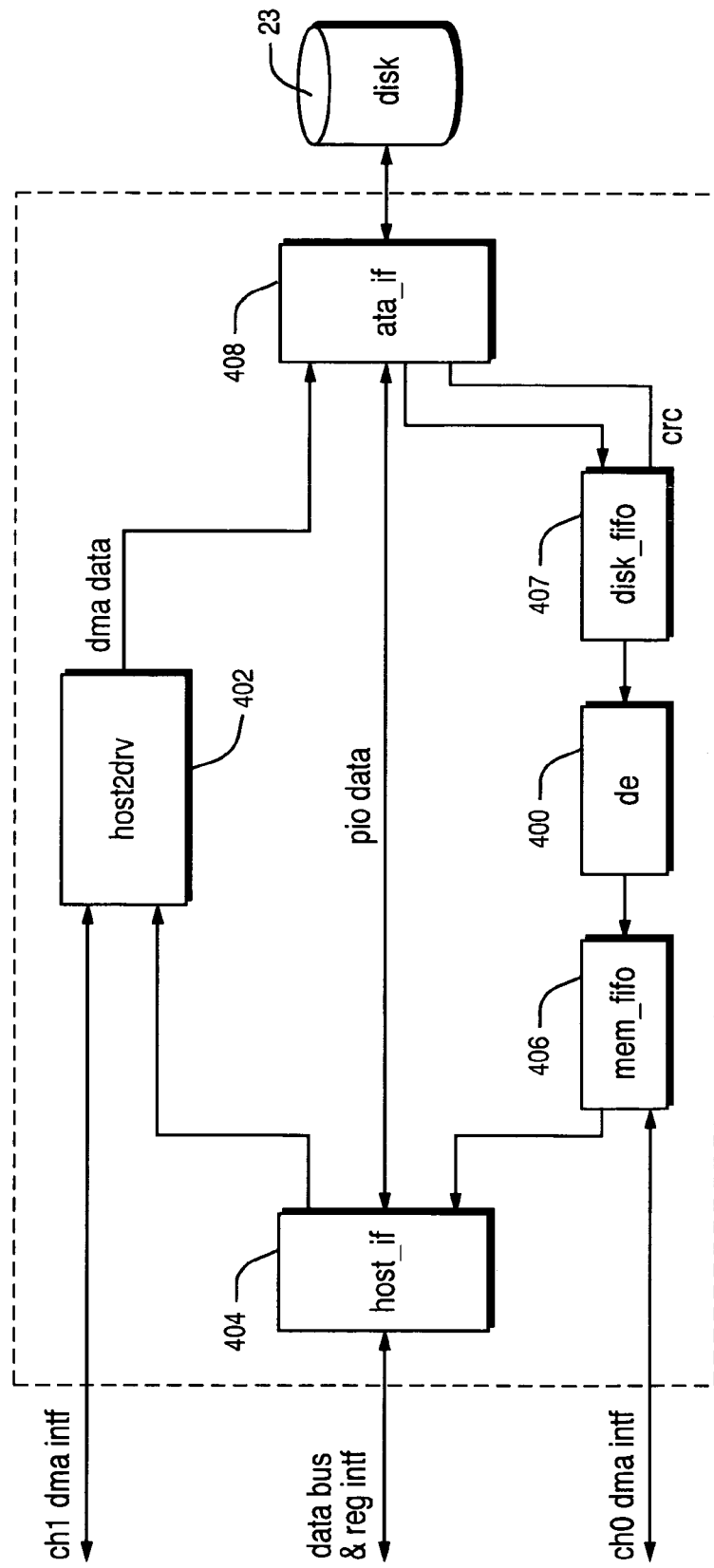
FIG. 5 is a block diagram of a Programmable Streaming Data Processor (PSDP) component.

One preferred embodiment of the PSDP 28 is now described in further detail in connection with FIG. 5. As shown in FIG. 5, a PSDP 28 consists of a finite state machine called the Data Engine 400, which implements filter logic and other control operations; a JPU interface 404; a disk interface (here the ATA interface 408); First-In-First-Out (FIFO) memories 406 and 407; and a DMA driver 402.

The PSDP 28 is in one sense an On-Line Analytic Processing (OLAP)-oriented disk drive interface. It contains logic that is capable of identifying records, filtering out the unwanted records, and selecting fields for return as the tuple sets. The PSDP 28 supports both a Programmed I/O (PIO) Mode-2 for register access by the JPU 22 and a UDMA (Ultra-Direct Memory Access) mode-4 for data transfers.

The terms "flow through" and "filtered" are used to differentiate DMA read modes. In flow-through mode, also referred to as "raw read" mode, data moves directly from the input to the output of the Data Engine 400 without being filtered. Data that is filtered has been processed, perhaps by culling records via a comparison and/or transaction ID processing (as described below), but typically by reformatting the records into tuple format, during which uninteresting fields can be dropped and PSDP-generated fields can be added. This process of culling records is called a "restrict" operation. The process of formatting fields into tuples is called a "project".

In filtering mode, disk blocks are pulled from a Disk FIFO 407, feeding them through the Block Header, Record Header, NULL Vector, Transaction ID, Field Parse, and Filter circuits in the Data Engine 400. Fields to be returned are pushed into the Memory FIFO 406.

There is of course also a DMA write mode, in which data from the JPU 22 flows through the DMA driver 402 directly to the ATA interface 408.

For all three DMA modes (write, raw read, and filtered read), the PSDP 28 shadows the read/write disk command in order to control its own DMA state machines. It does not shadow the disk address or sector count, nor does it have access to the memory addresses. For writes and raw reads, the PSDP 28 blindly moves data from one interface to the other until the JPU 22 disables the mode. The JPU 22 knows the quantity of data to be moved for these modes and uses the disk and DMA controller 402 interrupts to identify the end of transfer. For filtered reads, the quantity of data to be transferred to memory is generally unknown, and the JPU 22 identifies the end of transfer from the disk and filter interrupts. All of the record info—header and data—can be projected during a filtered read, but the block header info can only be returned by a raw read. DMA data integrity is protected across the disk interface by an IDE CRC check.

Figure 6:
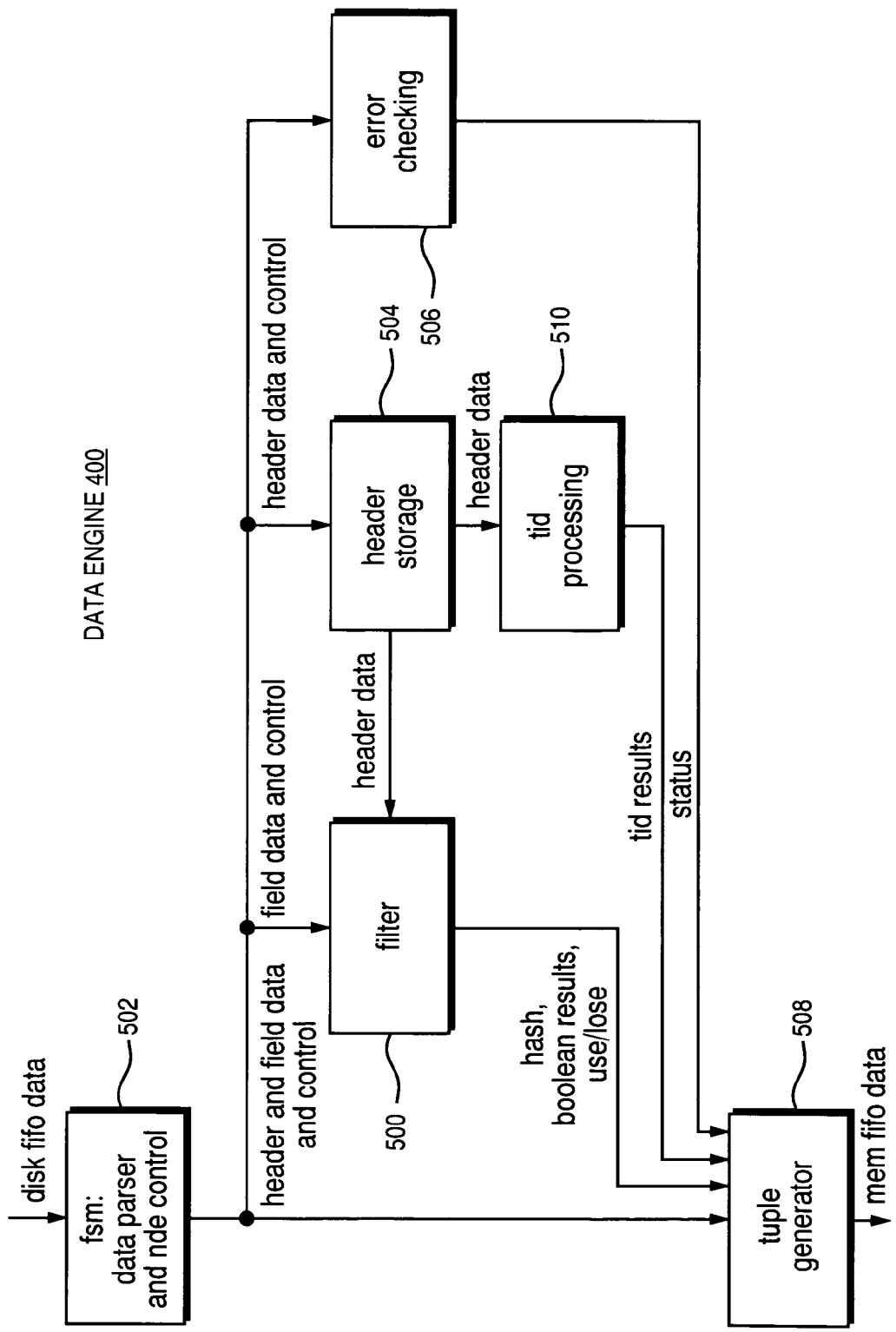
FIG. 6 is a more detailed view of portions of a PSDP.

As shown in FIG. 6, the Data Engine 400 includes filter logic 500, a data parser 502, header storage 504, transaction ID processing 510, error checking 506, and output tuple generator 508. In general, the data parser 502 is responsible for taking information from the disk 23 and formatting it into headers and fields so that the filter logic 500, header storage 504 and error checking 506 blocks can perform their respective tasks. The tuple generator 508 takes the output of the filter and TID processing 510 blocks and formats the results in a "tuple", suitable for processing by the JPU 22 or host 12.

Raw user table data as read from the disk 23 is understood and interpreted by the data parser 502. In one preferred embodiment at the present time, user table data is stored on disk in 128 KB segments called "blocks". Each block begins with an 8-word header, followed by 0 or more records. The format of the block header may be as follows:

| Block Header Field | Size | Details |
| --- | --- | --- |
| Magic number | 4 B | identifies beginning of block, always "FEEDFACE" |
| CRC-32 | 4 B | not used |
| Block number | 4 B | within the table, 0 based, only 19 significant bits |
| Block address | 4 B | starting sector number of the block |
| Block length | 4 B | in bytes, including header, but not trailing 0's |
| Layout ID | 4 B | like a version number on the data format |
| Table ID | 4 B | the Postgres object ID that uniquely identifies the table |
| Sector count | 1 B | defines block size, 0 means 256, as of this time, it's always 0 number of |
| Record count | 3 B | records in the block, 0 means 0 |

The CRC-32 field is meant to be computed by software and written to the disk along with the rest of the block header. Its calculation was to include all data from the block number through the end of the last sector of the block, including any trailing 0's. Its primary purpose was to detect data corruption resulting from hardware or software bugs, but it could have detected disk data-retention problems as well. It is unrelated to the UDMA-mode CRC-16 calculation required by the ATA-5 specification, which only guards the physical interface between the PSDP 28 and disk-drive IO buffers.

The sector count is the number of sectors in the block, which must be from 1 to 256. Thus a 0 in this 1-byte field means 256. The sector count occupies the most-significant byte of the last word of the block header.

The record count is the number of records in the block, which may be 0. Although the record count occupies the least-significant three bytes of the last word of the block header, only 13 bits are used.

A record as read from disk 23 into the Data Engine 400 is typically composed of a record header and one or more data fields, where the record header consists of three special fields, a length, and a null vector. The special fields are the row number, created transaction ID, and deleted transaction ID. All of the record header entries are optional on a per-table (not per-record) basis. However, if the record has a null vector, it must also have a record length, but not vice versa. The allowed data types are described elsewhere below.

| Record Header Field | Size | Detail |
| --- | --- | --- |
| Row number | 0 or 8 B | existence per RowNumberSize register |
| Created XID | 0 or 8 B | existence per CreatedXIDSize register |
| Deleted XID | 0 or 8 B | existence per DeletedXIDSize register |
| Record length | 0 or 2 B | size per RecordLengthSize register |
| Record NULL vector | 0 to 512 B | size per FieldCount register |

The row number (sometimes called row_num) is the unique number of the row or record in the user's table. It is distinct from the row address (sometimes called row13 addr), which is the complete physical address of a row in node-table-block-record format. The row number is also distinct from the record number, which is the 0-based ordinal number of a record within a block. The record number is the final component of the row address. The row address is computed by the PSDP.

The created XID contains the number, or ID, of the transaction that created the record.

The deleted XID. In the preferred embodiment, records are not actually deleted. Rather, they are marked as deleted so they can be restored if the transaction that performed the deleting is rolled back. (There are system management tools to reclaim the space.) A value of 0 indicates the record has not been deleted. A value of 1 indicates that the record was created by a transaction that was rolled back.

These XIDs support visibility in a multi-version database system, as is described in a related application (visibility application)

The record length is the length of the record in bytes, excluding the row number and the transaction IDs, but including the record length, the record null vector, the data fields, and any pad bytes at the end of the record needed for proper alignment of the first item of the following record. Thus, it is the distance in bytes from the beginning of the record length field to the beginning of the next record. Note that although all records in a table must have the same makeup, record lengths may vary because of variable-length character fields. The RecordLengthSize register defines record length sizes of 0, 1, 2, and 4 bytes, but only 0 and 2 are used.

The record null vector specifies which fields in the record are null, thereby indicating validity, not existence. For instance, a null varchar is not the same as an empty one. The record null vector consists of an even number of bytes. If it exists, the record null vector has the same number of bits as the record has data fields, and computes the number of half-words in the null vector as (FieldCount +15)>>4. This vector is an array of bytes. Bit 0 of the byte immediately following the record length corresponds to the $0^{th}$ data field; bit 7 of that byte corresponds to the $7^{th}$ data field; bit 0 of the last byte of the word that contains the record length corresponds to the $8^{th}$ data field; and so on.

There are strict rules governing field order and alignment. Both the record and its first data field must start on a word boundary (addr[1:0]=0). All record fields are self-aligned up to word boundaries. This means that 16, 12, 8, and 4 byte fields are word-aligned, 2-byte fields are ½-word-aligned (addr[0]=0), and 1-byte fields can start anywhere. The row number, created XID, and deleted XID are all 8 byte fields and do not require pad bytes to align them. If there is a record length but no record null vector, two pad bytes are required following the record length. If the record null vector exists, it immediately follows the record length and naturally starts on a two-byte boundary, but two pad bytes may be required following the record null vector to properly align the first data field.

The physical order of data fields, which often is not the same as the logical order, takes care of aligning non-character data fields; the physical order is N16, T12, N8, I8, F8, N4, I4, F4, D4, I2, D2, I1, C1, C2, . . . C16, V2. The fixed-length character fields are packed in as tightly as possible and are not aligned. Variable-length character fields start with a 2-byte length; they are ½-word-aligned and may require a preceding pad byte. Up to three pad bytes may follow the record's last data field in order to align the next record. If so, they are counted in the length of the earlier record.

More details of TID processing as performed by the TID processing block 510, includes rollback are contained in our co-pending U.S. Patent Application entitled "Controlling Visibility in Multi-Version Database Systems", by Foster D. Hinshaw et al. filed on Aug. 22, 2003.

Figure 7:
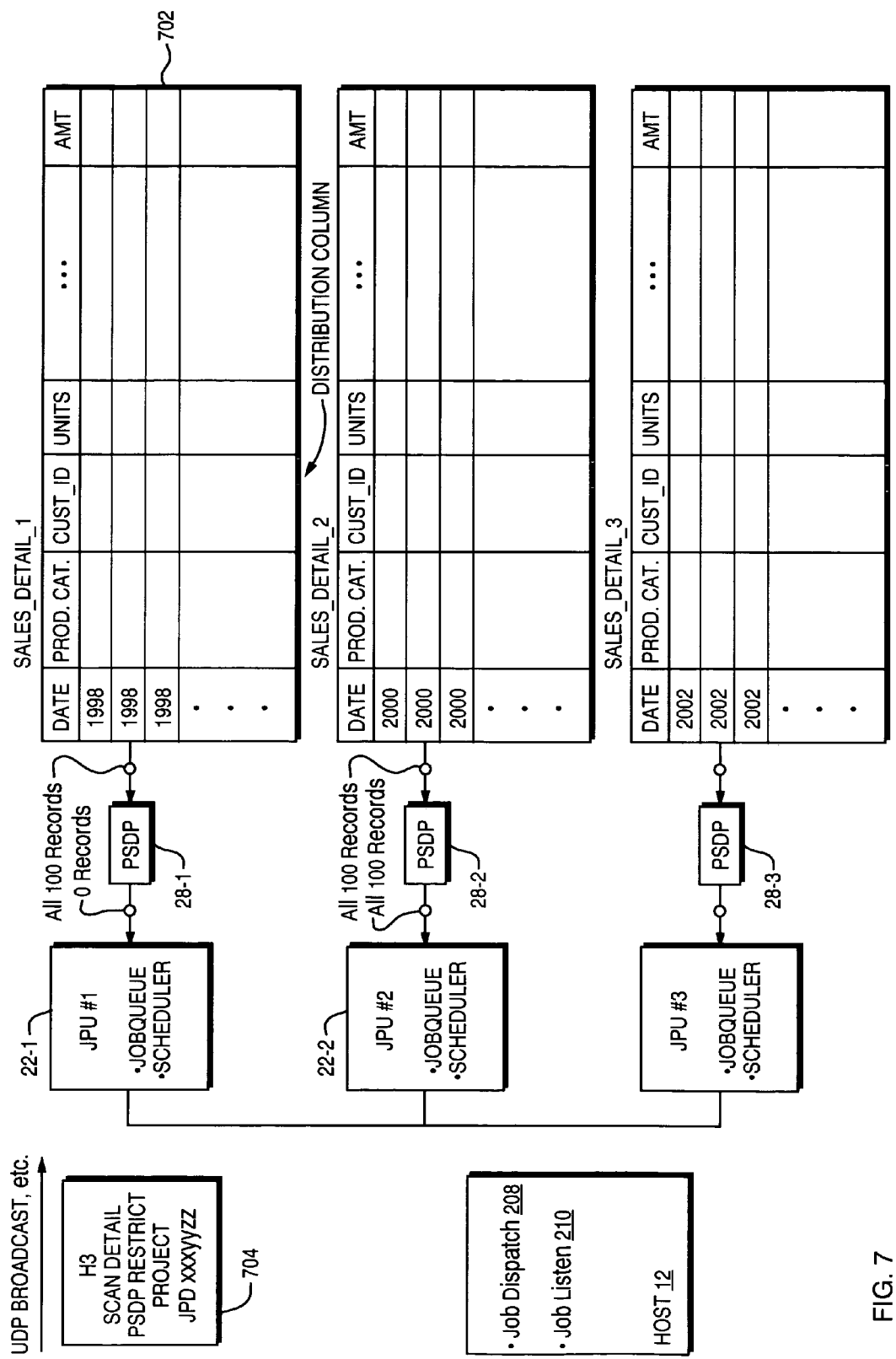
FIG. 7 is a detailed diagram of a Data Engine component.

A detailed circuit diagram of the filter/comparision logic 500 is shown in FIG. 7. The filter logic 500 supports up to 32 comparison (and hash) instructions. Each operates on a single field, which can be a header field, the row address, or a data field. Multiple instructions can operate on fields. Each instruction can perform two comparisons, using either a Data-String Register (DSR) 701 or temp registers 702 for the second operand(s); the two temp registers 702-0, 702-1are used to store an early record field for comparison to a later record field. There are two programmable, byte-wide substitution tables 703 that simplify character field comparisons by switching to all upper or lower case, for example. The instruction results are combined in the use/lose circuit 705. In the preferred embodiment, sixteen (16) different comparison function types are implemented by the logic units 720: e.g, true and false NOPs, the equality operators (=, !=, <, >=, >, <=), bit-vector join and its inverse, field is/is not null, field begins/does not begin with the operand, field contains/does not contain the operand. Although every comparison can be programmed for every supported data type (which may include integer, floating point, fixed- and variable-length character types etc.), not all combinations of data types and comparison operations are useful. The equality and null comparisons are appropriate for all types. For character comparisons, the string length and ASCII value of the characters determine inequality, such that "ABC" is less than "ABCD", and "A" is less than both "a" and "B". If a field is null, every comparison except null will fail. The bit-vector join and its inverse are for the integer data type. Begins, contains, and their inverses are for character types, both fixed- and variable-length.

As in traditional systems, for bit joins a bit vector is created with '1's in the positions corresponding to those positions where the join condition is true. In the preferred embodiment, during the setup phase the PSDP is loaded with a 4096-bit vector and the specific field position of the streaming data which is to be matched to that bit vector. During the streaming phase, as each tuple streams through the PSDP, the lower 12 bits of that field are mapped into the bit vector to determine if the corresponding bit is set to "1". If it is, then the join condition is "TRUE", otherwise it is "FALSE".

The SQL predicate "EXISTS" and other related predicates such as "ANY", "ALL", "NOT IN", "NOT EXISTS", "IN" are operated as an "EXISTS JOIN" type. This particular join type is implemented by modifying the nested loop hash, and merge join and bit join types. Typically, the smaller table is placed into memory with either a hash index or sorted with access methods of hash or binary. If the smaller table has a range smaller than 4096, then it is converted to a bit index and put into the PSDP as with the bit join above. During the streaming phase, as each tuple streams either through the PSDP 28 (in the case of exist bit joins) or through the CPU 26; the smaller table is scanned to see if it contains (or does not contain) the target field from the streaming tuple.

A "use/lose" logic circuit consists of up to eight sum or product terms. Each term can accept an input from each of the 32 instructions. The term outputs can be individually inverted before they're combined by either a sum-of-products (SOP) or product-of-sums (POS) calculation. Normally the filter indicates which records are to be kept, but the output of the SOP/POS calculation can be inverted to indicate which to reject. Taken altogether, the use/lose options provide deMorgan's Law term minimization.

While the record's data fields are parsed and optionally filtered, another circuit determines whether the record is valid by comparing the created and deleted transaction identifiers (IDs) to a data structure called the Invisibility List. The list contains up to 32 entries. The first is always the ID of the current transaction, that is the transaction that created the current scan. The remainder define the transactions that are concurrent to the "current" transaction. There are five modes: off, normal, dirty, silent, and rollback. Normal and dirty set a status bit in the returned tuple, as described in the section below on tuple formats; silent and rollback affect the tuple's return, in conjunction with the filter results.

A project function encompasses the selection of record fields, the generation of new fields, and the tuple formation and return. Tuples typically consist of a row number, some data fields, and a 2-byte length/status, but they can also include the created and/or deleted transaction IDs, the row address, up to 255 pad words, the 32 instructions results formed into a boolean word, the hash result, and a null vector.

The hash is used to organize similar tuples into groups for processing joins or grouping selects, and with the exception of the record null vector and length/status, all record-header and data fields can be used in its calculation. There are 7 defined hash modes, such as full CRC, which calculate a 32-bit CRC hash starting with a seed of zero and using all of the bytes of all of the fields selected. Blank spaces in character fields are skipped, as are leading 0's in unsigned and positive numerics and leading 1's in negative numbers. Hash operations are defined on a per-field basis by the comparison instructions.

Within the PSDP 28, a "tuple" is used to describe the projected data as output by the tuple 500. The tuple generator 508 uses principally the filter 500 output but can also use TID processing 510 and error checking 506 outputs (FIG. 5). The term "tuple" is used here for the purpose of differentiating "raw" disk 23 and PSDP 28 output record formats. A tuple contains fields projected from the source record and up to six "virtual"fields: row address, pad words (tuple scratch pad), the boolean results from each of the filter operations, a hash result, the tuple null vector, and the tuple length. All are optional on a per-table basis. The order of these fields is given in the following table.

| Tuple Field | Size | Details |
| --- | --- | --- |
| Row number | 0/8 B | from record header; upper two bytes are 0 |
| Created XID | 0/8 B | from record header; upper two bytes are 0 |
| Deleted XID | 0/8 B | from record header; upper two bytes are 0 |
| Row Address | 0/8 B | node.table.block.record |
| Pad Words | 0-256 W | Zeroed entries between specials and fields. |

-continued

| Tuple Field | Size | Details |
| --- | --- | --- |
| Data Fields | 0-nB | the data selected for return |
| Boolean Filter Result | 0/4 B | 32 bit results of the (up to) 32 instructions. |
| Hash Result | 0/4 B | computed by PSDP |
| Tuple Null vector | 0-512B | computed by PSDP; size known by software |
| Tuple length and Status | 0/1/2/4 B | computed by PSDP; the tuple length in bytes; size per TupleLengthSize register. |

The row number, created XID, deleted XID, and data fields are the same as described above.

The row address is a compressed version of the node, table, block, and record information. RowAddress[63:32] is defined by the NodeIDTableID register, a 32-bit register that is programmed with a 32-bit, merged version of the node ID and the table ID as part of the filter setup. RowAddress[31:13] is the 19-bit block number defined by the block header. RowAddress[12:0] is the 13-bit record number calculated by the PSDP 28; it is 0-based within the current block.

Software may define up to 255 pad words in the tuple immediately following the special fields.

The Boolean filter result contains the pass/fail result for each of the 32 filter instructions.

The hash result is the output of the hash circuit.

The tuple null vector contains the record null vector bits for each data field software requested. Note that record and tuple null vectors do not generally match up. The tuple null vector must consist of an even number of bytes and begin on a two-byte boundary. Software ignores any undefined bits as they may have been set by a previous scan. Once again, the existence of the null vector requires the existence of the length. Like the record null vector, the least-significant bit of byte 0 of the null vector refers to the $0^{th}$ field; the most-significant bit of byte 0 refers to the $7^{th}$ field; the least-significant bit of byte 1 refers to the $8^{th}$ field, and so on, but the alignment and therefore the location of each of the bytes is different.

The tuple length is the total length of the tuple in bytes, including leading specials at the beginning of the tuple and any pad bytes at the end needed for proper alignment of the first item in the following tuple. Although all tuples returned by a scan must have the same makeup, tuples sizes may vary due to variable-length character fields. The TupleLengthSize register defines tuple length sizes of 0, 1, 2, and 4 bytes. Because tuple fields are 4-byte aligned, tuple lengths are always multiples of four, and the least-significant two bits of the tuple length are available to indicate tuple status. Bit 0 is the overrun bit. When set, it means the tuple was returned despite failing to meet the filter conditions. This can happen if the tuple is so large that the PSDP must begin transferring it to JPU memory before the use/lose decision can be made, as described above. Bit 1 is the invalid bit. When set, it means the record from which this tuple was constructed has transaction IDs that make it invalid (i.e., invisibly created or visibly deleted).

With the exception of the length and nulls, tuple field alignments are the same as record field alignments. In the record the length and nulls precede the data fields, and the record null vector is left-aligned against the preceding record length. In the tuple the length and nulls follow the data fields, and the tuple null vector is right-aligned against the tuple length, which ends the tuple. The size of the tuple null vector and the requirement that it end in byte lane 1 together determine the location of its first byte: byte lane 0 or 2 (see the examples below). Aligning the tuple length in this manner makes it possible for software to locate the length while striding through the tuples backwards in memory. CPU software leaves enough space in memory at the head of the first tuple for a tuple length and null vector. This space allows relocating the length and null vectors ahead of the corresponding data fields as it walks the tuples backwards, then reverse direction to process the tuples forward. Alignment can require as many as five pad bytes between the last byte of data and the tuple null vector or length and, if neither null vector nor length exists, as many as three pad bytes following the last data byte.

Alignment examples for valid end of field data, tuple null vector, and tuple length:

| | No Length or Nulls | | | |
| --- | --- | --- | --- | --- |
| Address | 0 | 1 | 2 | 3 |
| I | data | data | data | data |
| i + 4 | data | data | data | data |
| i + 8 | data | data | data | data |

| | No Length or Nulls | | | |
| --- | --- | --- | --- | --- |
| Address | 0 | 1 | 2 | 3 |
| i | data | data | data | data |
| i + 4 | data | data | data | data |
| i + 8 | data | pad | pad | pad |

| | Length but No Nulls | | | |
| --- | --- | --- | --- | --- |
| Address | 0 | 1 | 2 | 3 |
| I | data | data | data | data |
| i + 4 | data | data | data | data |
| i + 8 | pad | pad | length 1 | length 0 |

| | Length but No Nulls | | | |
| --- | --- | --- | --- | --- |
| Address | 0 | 1 | 2 | 3 |
| i | data | data | data | data |
| i + 4 | data | pad | pad | pad |
| i + 8 | pad | pad | length 1 | length 0 |

| | Length and 2-Byte Null | | | |
| --- | --- | --- | --- | --- |
| Address | 0 | 1 | 2 | 3 |
| I | data | data | data | data |
| i + 4 | data | data | data | data |
| i + 8 | null 0 | null 1 | length 1 | length 0 |

| | Length and 4-Byte Null | | | |
|---|---|---|---|---|
| Address | 0 | 1 | 2 | 3 |
| i | data | pad | pad | pad |
| i + 4 | pad | pad | null 0 | null 1 |
| i + 8 | null 2 | null 3 | length 1 | length 0 |

D. Query Processing Example

As an aid in the illustrating how the system 10 processes data, an example database will be described that contains store sales data. The database defines a SalesDetail data table, a Customer data table, and a Store data table as follows:

SalesDetail
    StoreID
    CustomerID
    SaleDate
    ProductCategory
    Units
    Amount
Customer
    CustomerID
    Gender
Store
    StoreID
    StoreLocation A sample query might be to "show me the total units and dollar amount of rain gear sold to females in North Carolina in 2000, by customer ID." This can be translated into the SQL statement:

SELECT SalesDetail.CustomerID AS "CustID",
    Sum(SalesDetail.Units) AS "Sales Units",
    Sum(SalesDetail.Amount) AS "Sales Amount"
FROM SalesDetail, Customer, Store
WHERE SalesDetail.StoreID=Store.StoreID
    AND SalesDetail.CustomerID=Customer.CustomerID
    AND Store.StoreLocation="NC"
    AND Customer.Gender="Female"
    AND Year(SalesDetail.SaleDate)="2000"
    AND SalesDetail.ProductCategory="Raingear"
GROUP BY SalesDetail.CustomerID;

An output from this sample query with the total units and dollar amount of rain gear sold to females in North Carolina in 2000 by customer ID might be shown in tabular format:

| CustID | Sales Units | Sales Amount |
|---|---|---|
| 021442 | 1,300 | $ 45,000 |
| 021443 | 1,200 | $ 41,000 |
| 021449 | 1,800 | $ 60,000 |
| 021503 | 3,500 | $ 98,000 |
| 021540 | 4,200 | $112,000 |
| 021599 | 5,000 | $150,000 |
| 021602 | 4,700 | $143,000 |
| 021611 | 4,100 | $104,000 |
| 021688 | 3,600 | $101,000 |
| 021710 | 2,000 | $ 65,000 |
| 021744 | 1,200 | $ 41,000 |
| 021773 | 1,500 | $ 43,000 |

Using the above example, a basic execution plan can be created by the SQL Expression Evaluator 207, plan generator 204 and plan optimizer 205 of the host(s) 12. The plan might specify for example, to perform joins and aggregations on the JPUs 22, with restriction functions being performed on the Programmable Streaming Data Processor (PSDP) 28.

| Job | Locale | Operation |
|---|---|---|
| 1 | JPU | SCAN Customer |
| | PSDP | RESTRICT Gender = "Female" |
| | JPU | PROJECT CustomerID |
| | JPU | SAVE AS TEMPCustomer |
| 2 | JPU | SCAN Store |
| | PSDP | RESTRICT StoreLocation = "NC" |
| | JPU | PROJECT StoreID |
| | JPU | BROADCAST AS TEMPStore |
| 3 | JPU | SCAN SalesDetail |
| | PSDP | RESTRICT ProductCategory = "Raingear" AND Year(SaleDate) = "2000" |
| | JPU | PROJECT CustomerID, StoreID, Units, Amount |
| 4 | JPU | JOIN WITH TEMPStore, StoreID = TEMPStore.StoreID |
| | JPU | PROJECT CustomerID, Units, Amount |
| 5 | JPU | JOIN WITH TEMPCustomer, CustomerID = TEMPCustomer.CustomerID |
| | JPU | PROJECT CustomerID, Units AS "Units", Amount AS "Amt" |
| 6 | JPU | GROUP By CustomerID |
| | JPU | AGGREGATE Sum(Units) AS "Units", Sum(Amt) AS "AmtTotal" |
| | JPU | PROJECT CustomerID, "Units", "AmtTotal" |
| | JPU | RETURN HOST |
| 7 | HOST | RETURN USER |

Referring back to FIGS. 1 and 3, the query is passed from the application (which may be running on, Business Intelligence Application 30 local application server 29 or client 36), the Plan Generator 204 then creates tentative execution plans. Plans not only specify the above job descriptions, but also may specify whether specific jobs can run on currently or must run in sequence on the JPUs. The Plan Optimizer 205 selects one of the plans and optimizes that plan and passes it to the Plan Link 206. The Plan Link 206 expands the plan as necessary, based on where parts of the plan will be executed, and then passes the expanded plan to the Host Dispatch 208. The Host Dispatch 208 then sends individual Jobs within the plan to the respective locales (i.e., the JPUs 22) for execution. In this example, jobs 1-6 are sent to the JPUs 22 for execution, with job 7 reserved for the host 12.

For example, Job 1 scans the Customer table with the required restriction and projection, and materializes it. Job 2 scans the Store table with the required restriction and projection, and since it is a small table, broadcasts the resulting tuple set to all JPUs 22, where the tuples from all JPUs 22 are then accumulated and saved in memory as TEMPStore. Jobs 1 and 2 are specified or determined to run concurrently if possible.

The Host Dispatch 208 may thus combine Jobs 3-6 into one streaming job because they can all be implemented in a streaming manner without materialization of intermediate sets. This combined job scans the SalesDetail table, with its restrictions and projections. As the tuples are received from scan run by the PSDP 28, each tuple is joined with TEMPStore and TEMPCustomer and aggregated. On the aggregation node, as each new customer ID is received, the previous one and its sums are sent to the host, where Job 7 is then invoked in a streaming fashion, to return the aggregated tuples through the ODBC connection 38 back to the user.

FIG. 7 is a diagram illustrating how an exemplary job is processed by a set of JPUs 22, in the second group. The example Job 3 replicated here again included instructions

| | | |
|---|---|---|
| 3 | JPU | SCAN SalesDetail |
| | PSDP | RESTRICT ProductCategory = "Raingear" AND Year(SaleDate) = "2000" |
| | JPU | PROJECT CustomerID, StoreID, Units, Amount |

Individual jobs are forwarded from the host 12 to typically many JPUs 22 in parallel as a broadcast message. The broadcast message is typically sent as a User Datagram Protocol (UDP) type message, but can also be sent in other ways, such as a Transmission Control Protocol (TCP) message or a unicast message.

Upon receipt of a job message at the job listener 301, the JPU dispatch unit 304 informs the transaction manager 306 and storage manager 320 to then schedule Job 3 for execution. More details of job execution can be found in the related co-pending U.S. Patent application entitled "Programmable Data Streaming Architecture Having Autonomous and Asynchronous Job Processing Unit," (application Ser. No. 10/667, 128) mentioned above.

While this invention has been particularly shown and described with references to preferred embodiments thereof, it will be understood by those skilled in the art that various changes in form and details may be made therein without departing from the scope of the invention encompassed by the appended claims.

What is claimed is:

1. An asymmetric data processor comprising:
    a first group of nodes comprising one or more host processors, each host comprising a memory, a network interface, and one or more Central Processing Units (CPUs), wherein each host accepts and responds to queries for data, and transforms such queries into one or more jobs;
    a second group of nodes comprising a plurality of Job Processing Units (JPUs), wherein each JPU comprises:
    a memory, for storing data;
    a network interface, for receiving data and instructions;
    a streaming data interface, for receiving data from a streaming data source;
    one or more general purpose CPUs, for responding to requests from at least one host computer in the first group, and to requests from other JPUs in the second group; and
    one or more Programmable Streaming Data Processors (PSDPs) configured to perform filtering functions directly on data received from the streaming data interface, each PSDP thus performing initial processing on a set of data; and
    a network connecting the nodes within each group and between the two groups; and
    wherein a JPU at the second group of nodes is configured to receive jobs from one or more nodes in the first group, perform work requested by the jobs, and generate a result based on the work.

2. The apparatus of claim 1 wherein the data comprises structured records, and the structured records further comprise fields of various lengths and data types.

3. An apparatus as in claim 2 in which at least one selected PSDP performs Boolean comparisons of record field values against other values.

4. An apparatus as in claim 3 wherein the Boolean comparison is against at least one of other record field values and values held internally to that PSDP.

5. An apparatus as in claim 3 in which the selected PSDP restricts records that fail Boolean comparisons of field values, as such records stream into the PSDP and before such records are placed into the memory of the associated JPU.

6. An apparatus as in claim 2 in which the selected PSDP filters out fields of records that are not needed for particular queries, as such fields stream into the PSDP and before such fields are placed into the memory of the associated JPU, projecting forward into JPU memory those fields that are needed.

7. An apparatus as in claim 2 in which the PSDP output data may contain projected fields not contained in the source data, such as row address, transforms, results of expression evaluation, results of bit joins, and results of visibility tests.

8. An apparatus as in claim 2 in which a selected PSDP decompresses at least one of fields and records.

9. An apparatus as in claim 2 in which a selected PSDP performs a join operation, where the field values being joined have a small range of values, so that the presence or absence of a particular value can then be encoded as a bit within a sequence of bits, whose position within the sequence corresponds to the field value.

10. An apparatus as in claim 2 in which a selected PSDP performs an "exist join" operation, where the field values being joined have a small range of values, so that the presence or absence of a particular value can then be encoded as a bit within a sequence of bits, whose position within the sequence corresponds to the field value.

11. An apparatus as in claim 2 in which an initial query is provided by a structured query language (SQL) statement, and the records specified thereby exist in various processing states within at least two components of the system, the two components including at least one of a PSDP within a JPU and a host.

12. An apparatus as in claim 11 in which a PSDP processes fields within records are received from the streaming data source, without waiting to process any records until all records are received.

13. An apparatus as in claim 1 wherein the filtering functions performed by the PSDPs comprise field-level filtering.

14. An apparatus as in claim 1 wherein the streaming data interface is an industry standard mass storage interface.

15. An apparatus as in claim 1 wherein the streaming data interface is connected to receive data from a peripheral device selected from the group consisting of disk drive, network interface, and other streaming data source.

16. An apparatus as in claim 1 in which space is reserved in JPU memory at the head of the first tuple produced by the PSDP for recording tuple length and null vector, so that the length and null vectors from the end of the tuple may be relocated to this space.

17. An apparatus as in claim 1 in which at least one PSDP is implemented as a Field Programmable Gate Array (FPGA).

18. An apparatus as in claim 1 in which the host computers in the first group contain software comprising a plan optimizer component that determines which filtering functions should be executed within a PSDP.

19. An apparatus as in claim 1 in which the JPUs in the second group contain software comprising a plan optimizer component that determines which filtering functions should be executed within a PSDP.

20. An apparatus as in claim 1 in which the host computers in the first group contain software comprising a plan link component, which determines a query execution plan, the query execution plan further having portions that will be processed by a PSDP, portions that will be processed by a JPU after a PSDP has returned data to the JPU, and portions that will be processed by a host, after the JPU has returned data to the host group.

21. An apparatus as in claim 1 in which the JPUs in the second group contain software comprising a plan link component, which determines a query execution plan, the query execution plan further having portions that will be processed by a PSDP, portions that will be processed by a JPU after a PSDP has returned data to the JPU, and portions that will be processed by a host, after the JPU has returned data to the host group.

22. An apparatus as in claim 1 in which the hosts in the first group contain software comprising a PSDPPrep component, which, for a given query execution plan, defines filtering instructions.

23. An apparatus as in claim 1 in which the JPUs in the second group contain software comprising a PSDPPrep component, which, for a given query execution plan, defines filtering instructions.

24. An apparatus as in claim 23 wherein the instructions defined by the PSDPPrep component include instructions to process fields of records.

25. An apparatus as in claim 23 in which a PSDPPrep component further identifies at least one of filtering, transformation, projection and aggregation operations to be performed by a PSDP.

26. An apparatus as in claim 23 in which a PSDPPrep component further modifies the query execution plan to specify restrict operations that are to be performed by a PSDP instead of a JPU.

27. An apparatus as in claim 1 in which the JPUs contain software comprising a PSDP Filter component, which loads an executable code image into a PSDP.

28. An apparatus as in claim 1 in which the JPUs contain software comprising a PSDP Scheduler component, which schedules jobs to run on a PSDP and queues PSDP requests to retrieve required data.

29. An apparatus as in claim 1 in which the JPUs in the second group contain software comprising a JPU Resource Scheduler component, which is responsible for scheduling jobs to be run on the JPU.

30. An apparatus as in claim 29 in which the JPU Resource Scheduler component further schedules jobs to run on a PSDP, communicating with a PSDP Scheduler component to queue up PSDP requests to retrieve required data.

31. An apparatus as in claim 29 in which the JPU Resource Scheduler component further schedules jobs, in which similar PSDP instructions in different query execution plans are combined to avoid duplicate PSDP processing requests.

* * * * *

UNITED STATES PATENT AND TRADEMARK OFFICE
CERTIFICATE OF CORRECTION

PATENT NO. : 7,577,667 B2
APPLICATION NO. : 10/668113
DATED : August 18, 2009
INVENTOR(S) : Hinshaw et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1690 days.

Signed and Sealed this

Seventh Day of September, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,577,667 B2 | Page 1 of 1 |
| APPLICATION NO. | : 10/668113 | |
| DATED | : August 18, 2009 | |
| INVENTOR(S) | : Foster D. Hinshaw et al. | |

It is certified that error appears in the above-identified patent and that said Letters Patent is hereby corrected as shown below:

Title Page, illustrative figure, add reference numeral --34-- to the vertical bus line shown in the right-hand area of the figure.

In the drawings,

Sheet 1, Fig. 1, add reference numeral --34-- to the vertical bus line shown in the right-hand area of the figure.

Sheet 3, Fig. 3, replace "Host Recovery Mgr 261" with --Host Recovery Mgr 266--.

Figure 4:
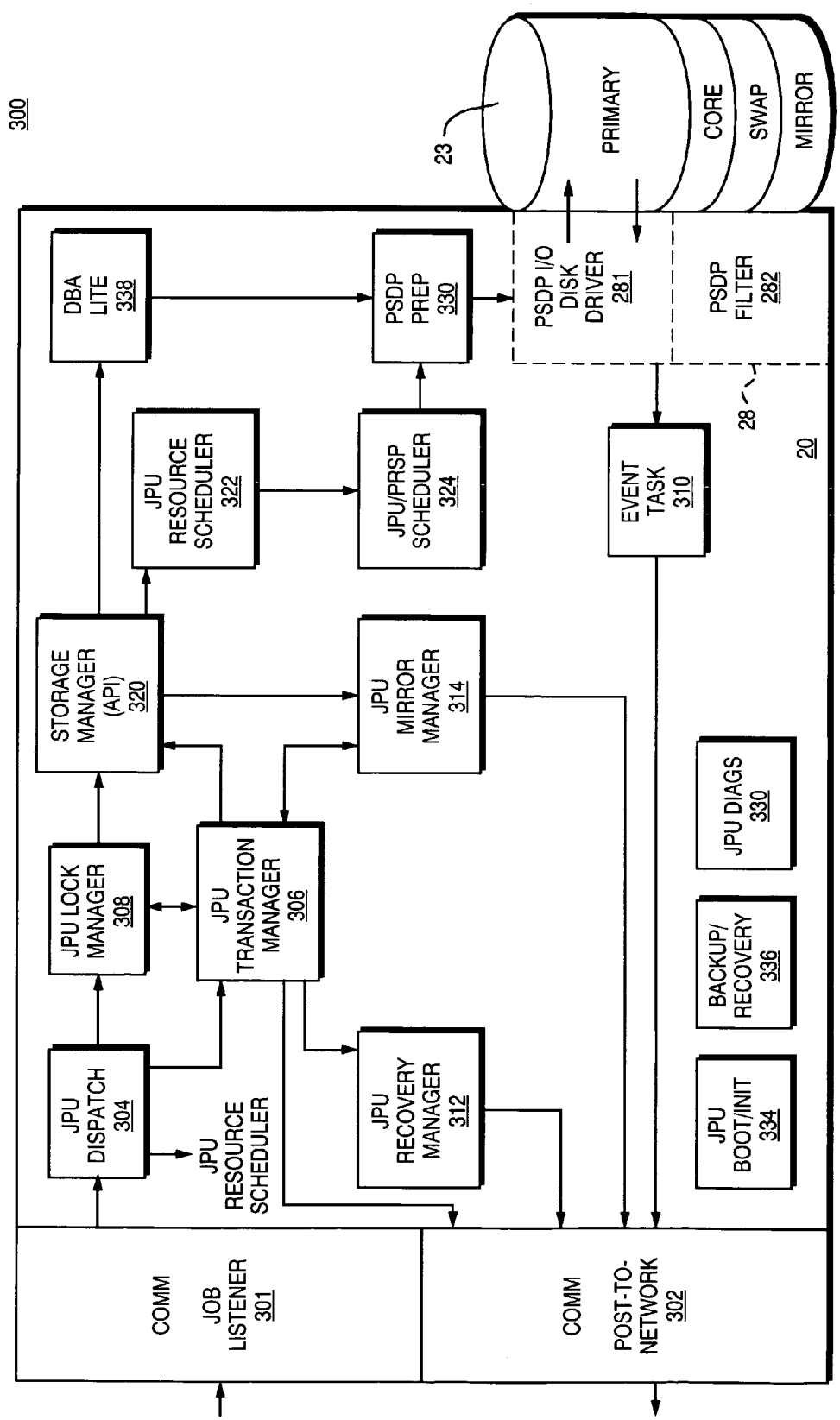
FIG. 4 is a more detailed view of Job Processing Unit (JPU) software components.

Sheet 4, Fig. 4, replace reference numeral "300" in upper right-hand corner with --22--; and add reference numeral --300-- with a connection to top block COMM in upper left-hand portion.

In the specification,

Column 7, line 37, replace reference numeral "28" with --38--; and line 52, replace reference numeral "11" with --16--.

Column 16, line 27, replace reference numeral "281" with --282--.

Signed and Sealed this
Nineteenth Day of May, 2015

Michelle K. Lee
*Director of the United States Patent and Trademark Office*